(12) United States Patent
Crawford et al.

(10) Patent No.: US 10,571,605 B2
(45) Date of Patent: Feb. 25, 2020

(54) METHOD AND SYSTEM FOR MODELING AND SIMULATING A FRACTURED RESERVOIR

(71) Applicants: Brian R. Crawford, Spring, TX (US); Janelle M. Homburg, The Woodlands, TX (US); Jordan A. Freysteinson, Houston, TX (US); William C. Reese, Cypress, TX (US); Michael C. Tsenn, Houston, TX (US)

(72) Inventors: Brian R. Crawford, Spring, TX (US); Janelle M. Homburg, The Woodlands, TX (US); Jordan A. Freysteinson, Houston, TX (US); William C. Reese, Cypress, TX (US); Michael C. Tsenn, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 419 days.

(21) Appl. No.: 15/469,020

(22) Filed: Mar. 24, 2017

(65) Prior Publication Data

US 2017/0275970 A1    Sep. 28, 2017

Related U.S. Application Data

(60) Provisional application No. 62/314,040, filed on Mar. 28, 2016.

(51) Int. Cl.
*G01V 99/00* (2009.01)
*E21B 43/26* (2006.01)

(52) U.S. Cl.
CPC ............ *G01V 99/005* (2013.01); *E21B 43/26* (2013.01); *G01V 2210/646* (2013.01)

(58) Field of Classification Search
CPC . G01V 99/005; G01V 2210/646; E21B 43/26
See application file for complete search history.

(56) References Cited

U.S. PATENT DOCUMENTS

| 6,810,332 B2 | 10/2004 | Harrison |
| 6,826,483 B1 | 11/2004 | Anderson et al. |
| 6,985,841 B2 | 1/2006 | Barroux |

(Continued)

OTHER PUBLICATIONS

Tae Hyung Kim, Fracture Characterization and Estimation of Fracture Porosity of Naturally Fractured Reservoirs With No Matrix Porosity Using Stochastic Fractal Models, Texas A&M University, Dec. 2007 (Year: 2007).*

(Continued)

*Primary Examiner* — Rehana Perveen
*Assistant Examiner* — Chuen-Meei Gan
(74) *Attorney, Agent, or Firm* — ExxonMobil Upstream Research Company-Law Department

(57) ABSTRACT

The present disclosure describes methods and systems to enhance subsurface models of fractured reservoirs. In particular, the methods and systems described herein incorporate the effects of "dynamic" compressible fractures and, thus, can improve predictions of fractured reservoir performance over time. The methods and systems may utilize predictive algorithms for mechanical and hydraulic stiffness properties of the fracture network that are based at least in part on a database of measurements derived from single fractures.

20 Claims, 15 Drawing Sheets

(56) References Cited

U.S. PATENT DOCUMENTS

| | | | |
|---|---|---|---|
| 7,526,418 B2 | 4/2009 | Pita et al. | |
| 7,542,850 B2 | 6/2009 | Humphrey et al. | |
| 7,596,480 B2 | 9/2009 | Fung et al. | |
| 7,617,082 B2 | 11/2009 | Childs et al. | |
| 7,676,326 B2 | 3/2010 | Podladchikov et al. | |
| 7,809,538 B2 | 10/2010 | Thomas | |
| 8,219,320 B2 | 7/2012 | Saenger | |
| 8,577,613 B2 | 11/2013 | Bryant et al. | |
| 2010/0155142 A1* | 6/2010 | Thambynayagam | E21B 44/00 175/61 |
| 2011/0257944 A1* | 10/2011 | Du | E21B 43/267 703/2 |
| 2016/0154907 A1* | 6/2016 | Halabe | G06F 17/5009 703/7 |

OTHER PUBLICATIONS

Moinfar, Ali, Kamy Sepehrnoori, Russell T. Johns, and Abdoljalil Varavei. "Coupled geomechanics and flow simulation for an embedded discrete fracture model." In SPE Reservoir Simulation Symposium. Society of Petroleum Engineers, 2013. (Year: 2013).*

Dardashti, A.F. and Ajalloeian, R. (2015) Evaluation of Hydraulic Aperture of the Joints of Behesht Abad Dam Foundation, Iran. Open Journal of Geology, 5, 375-382. (Year: 2015).*

Aguilera, R., "Effect of Fracture Compressibility on Oil Recovery from Stress-Sensitive Naturally Fractured Reservoirs," Petroleum Scociety of Canada, doi: 10.2118/2003-113, 20 pgs. (2003).

Bandis, S.C. et al., "Fundamentals of Rock Joint Deformation," Int. J. Rock Mech. Min. Sci. & Geomech. Abstr., 20(6), pp. 249-268 (1983).

Barton, N. et al., "Strength, Deformation and Conductivity Coupling of Rock Joints," Int. J. Rock Mech. Min Sci. & Geomech. Abstr., 22(3), pp. 121-140 (1985).

Barton, N. et al., "The Shear Strength of Rock Joints in Theory and Practice," Rock Mechanics, 10, pp. 1-54 (1977).

Brooker, E.W. et a., "Earth Pressures at Rest Related to Stress History," Canadian Geotechnical J., II(1), pp. 1-15 (Feb. 1965).

Cladouhos, T.T. et al., "Are fault growth and linkage models consistent with power-law distributions of fault lengths,?", J. Struct. Geol., pp. 281-293 (1996).

Crawford, B.R. et al., "Modeling and Prediction of Formation Compressibility and Compactive Pore Collapse in Siliciclastic Reservoir Rocks," ARMA Paper #11-384, 45th US Rock Mechanics/Geomechanics Symposium, San Francisco, CA, 14 pgs. (Jun. 26-29, 2011).

Dershowitz, W. et al., "Discrete fracture approaches for oil and gas applications," Proceedings NARMS '94, North American Rock Mechanics Symposium, Austin, TX, pp. 19-30 (1994).

Engelder, T. et al., "Fluid Flow Along Very Smooth Joints at Effective Pressures up to 200 Megapascals," Mechanical Behavior of Crustal Rocks, Geophys. Monogr., 24, pp. 147-152 (1981).

Gillespie, P.A. et al., "Scaling relationships of joint and vein arrays from the Burren, Co. Clare, Ireland," J. of Structural Geology, 23, pp. 183-201 (2001).

Jaeger, J.C., et al., "Fundamentals of Rock Mechanics," Blackwell Publishing, pp. 27-38 (2007).

Klimczak, C. et al., "Cubic law with aperture-length correlation: implications for network scale fluid flow," Hydrogeology Journal, doi: 10.1007/s10040-009-0572-6, 12 pgs. (2010).

Kranz, R.L. et al., "The Permeability of Whole and Jointed Barre Granite," Int. J. Rock Mech. Min. Sci. & Geomech. Abstr., 16, pp. 225-234 (1979).

Laubach, S.E. et al., "Practical approaches to identifying sealed and open fractures," AAPG Bulletin, 87(4), pp. 561-579 (Apr. 2003).

Longuemare, P. et al., "Geomechanics in Reservoir Simuolation: Overview of Coupling Methods and Field Case Study," Oil & Gas Science and Techn., 57(5), pp. 471-483 (2002).

Nelson, R.A. et al., "Experimental Study of Fracture Permeability in Porous Rock," The American Ass. of Petroleum Geologists Bulletin, 61(2), pp. 227-236 (Feb. 1977).

Oda, M., "Permeability tensor for discontinuous rock masses," Geotecnique 35(4), pp. 483-495 (1985).

Parney, R. et al., "Fracture and Production Data Integration Using Discrete Fracture Network Models for Carbonate Reservoir Management, South Oregon Basin Field, Wyoming," SPE 60306, 2000 Rock Mountain Section SPE Meeting, 7 pgs.(2000).

Rossen, R.H. et al., "Simulation of Gas/Oil Drainage and Water/Oil Imbibition in Naturally Fractured Reservoirs," SPE Reservoir Eng., pp. 464-470 (Nov. 1989).

Schlutz, R.A. et al., "Terminology for structural discontinuities," AAPG Bulletin, 92(7), pp. 853-867 (Jul. 2008).

Suli, E. et al., "An introduction to Numerical Analysis," Cambridge University Press, pp. 19-25 (2003).

Warren, J.E. et al., "The Behavior of Naturally Fractured Reservoirs," SPE 426, Society of Petroleum Eng., pp. 245-255 (Sep. 1963).

Witherspoon, P.A. et al., "Validity of Cubic Law for Fluid Flow in a Deformable Rock Fracture," Water Resources Research, 16(6), pp. 1016-1024 (Dec. 1980).

Zangerl, C. et al., "Normal stiffness of fractures in granitic rock: A compilation of laboratory and in-situ experiments," Int'l. J. of Rock Mechanics & Mining Sciences, 45, pp. 1500-1507 (2008).

Zimmerman, R.W. et al., "Hydraulic Conductivity of Rock Features," Transport in Porous Media, 23, pp. 1-30 (1996).

Dershowtiz, B. et al., "Integration of Discrete Feature Network Methods with Conventional Simulator Approaches," SPE 49069, SPE Ann. Tech. Conf. & Exhibition, New Orleans, LA, pp. 351-259 (Sep. 27-30, 1998).

ASTM D3967-16, "Standard Test Method for Splitting Tensile Strength of Intact Rock Core Specimens", ASTM International, West Conshohocken, PA, 2016, pp. 1-5.

ASTM D4543-08e1 "Standard Practices for Preparing Rock Core as Cylindrical Test Specimens and Verifying Conformance to Dimensional and Shape Tolerances", ASTM International, West-Conshohocken, PA, 2008, pp. 1-9.

ASTM D5607-16 "Standard Test Method for Performing Laboratory Direct Shear Strength Tests of Rock Specimens Under Constant Normal Force", ASTM International, West Conshohocken, PA, 2016, pp. 1-9.

ASTM D5731-16 "Standard Test Method for Determination of the Point Load Strength Index of Rock and Application to Rock Strength Classifications", ASTM International, West Conshohocken, PA, 2016, pp. 1-11.

ASTM D7012-14e1, "Standard Test Method for Compressive Strength and Elastic Moduli of Intact Rock Core Specimens under Varying States of Stress and Temperatures", ASTM International, West Conshohocken, PA, 2014, pp. 1-9.

ASTM D7070-16, "Standard Test Method for Creep of Rock Core Under Constant Stress and Temperature", ASTM International, West Conshohocken, PA, 2016, pp. 1-7.

Goodman, R. E. (1976) "Methods of Geological Engineering in Discontinuous Rocks", West Publishing Company, 378 pages, Chapters 1-8. Upload Part 2; 104 pages—Apendices One-Two, Subject Index and Author Index.

* cited by examiner

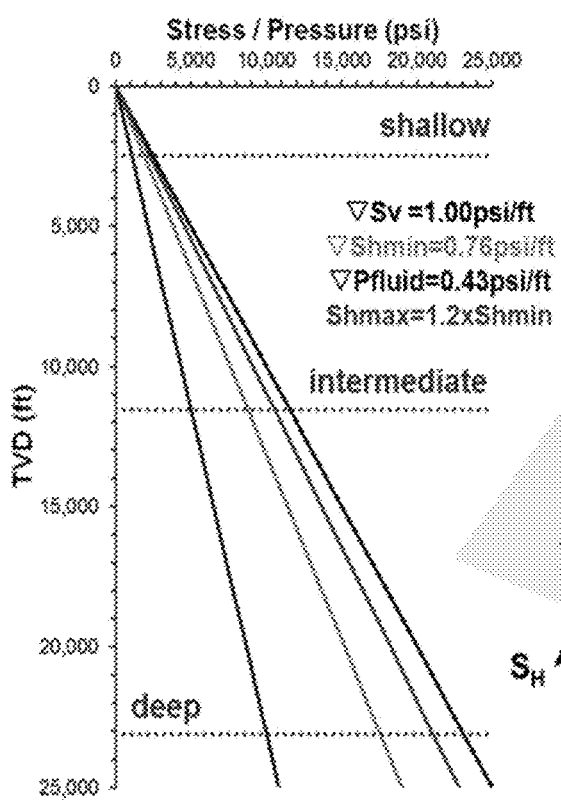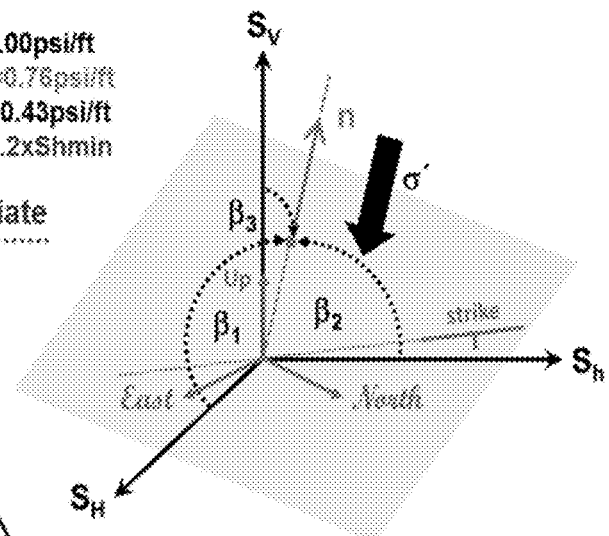
Figure 12A
Figure 12B

METHOD AND SYSTEM FOR MODELING AND SIMULATING A FRACTURED RESERVOIR

CROSS REFERENCE TO RELATED APPLICATIONS

This application claims the benefit of U.S. Provisional Application No. 62/314,040 entitled "Method and System for Simulating a Fractured Reservoir" filed on Mar. 28, 2016, the disclosure of which is incorporated herein by reference.

FIELD OF THE INVENTION

Described herein are methods and systems for modeling and/or simulating a fractured reservoir. In particular, the method and systems account for the effects of compressible fractures in the reservoir and, thus, provide improved productivity prediction of the fractured reservoir.

BACKGROUND

In the oil and gas industry, modeling of the subsurface is typically utilized for visualization and to assist with analyzing the subsurface volume for potential locations of hydrocarbon resources, well planning for field deployment, and development plans for producing from a reservoir. Accordingly, various methods exist for estimating properties of subsurface volumes which are then used to model and simulate the subsurface volume. However, reservoir modeling and/or simulation is significantly more challenging for fractured reservoirs than it is for conventional un-fractured reservoirs.

Many fine-grained reservoirs (e.g., clastics, carbonates, and mudrocks) require additional permeability associated with partially open natural fractures in order to achieve economic flow rates. Thus, it is important to be able to accurately model and simulate a fractured reservoir to determine if economic flow rates are achievable. However, while the impact of depletion-driven matrix compaction is often accounted for when simulating the performance of conventional reservoirs, such as deep-water sands, the ability to predict in a similar fashion the impact of declining fluid pressure on the productivity of a fractured reservoir, particularly a naturally fractured reservoir, has been a challenge. Thus, there remains a need for a method to predict and model the changes in a fractured reservoir.

Previously the dual porosity approach has been used to simulate fractured reservoirs. See Warren et al., "The Behavior of Naturally Fractured Reservoirs", *Society of Petroleum Engineers*, doi 10:2118/426-PA (1963). This approach utilizes an interacting continuum to reflect storage and permeability characteristics of a natural fracture network. However, the dual porosity approach does not adequately address connectivity, which is generally better addressed by discrete fracture network (DFN) models. See Dershowitz et al. "Discrete Fracture Approaches for Oil and Gas Applications," Proceedings from the North American Rock Mechanics Symposium, Austin, Tex. (1994).

A representation of a conventional method for linking dual porosity and DFN models is shown in FIG. 1. In general, grid cells and properties, such as lithology, that are associated with each cell are exported from a geologic model 100 into a DFN model 110. A representation of the natural fracture system is then generated within the DFN model 110 utilizing techniques that use data from a number of sources, such as core, outcrop, well, and seismic data. The DFN model 110 can typically incorporate multiple fracture sets each having spatial distributions of fracture intensities, sizes (lengths and apertures), and orientations. The DFN model 110 is then used to determine: (i) fracture system porosity, which is typically calculated as the product of fracture intensities expressed as fracture area per unit volume and fracture apertures; (ii) directional fracture system permeabilities in the x-, y-, and z-directions, which are typically calculated using tensor approaches in which the equivalent porous medium properties of each grid cell are dependent on the fracture intensity, connectivity of the fracture network, and distribution of fracture transmissivities, see Oda, "Permeability Tensor for Discontinuous Rock Masses", *Géotechnique*, 34(4), pp 483-495 (1985), and; (iii) fracture spacing/matrix block size in the x-, y-, and z-directions, which provide a measure of the accessibility of the matrix system through the fracture system and is related to various aspects of the fracture system such as orientation, number of fracture sets, and intensity. Fracture system porosity, directional fracture system permeabilities, and matrix block sizes are then exported from the DFN model 110 into the dual porosity reservoir simulator 120. The simulator 120 can then be history matched 130 with well testing data (e.g., permeability thickness or productivity index) in order to achieve a good calibration with field production data. Once calibrated, the simulator 120 may then be run in a forecast mode to predict the performance of the reservoir 140.

A major shortcoming of the approach for incorporating natural fractures into reservoir simulations that is illustrated in FIG. 1 is that all directional fracture system permeabilities and fracture system porosities are necessarily "static" values. That is, the fracture system permeabilities and fracture system porosities constitute a single representation of the fracture system at a particular state of stress, which is the unstressed condition associated with the outcrop or core description of fracture geometric properties, the initial reservoir stress conditions associated with the history matching of the well data prior to production, or some combination of the two. As such, the model is not able to account for the dynamic character of a compressible fracture system in which progressive closure of the fracture apertures due to production-induced drawdown and/or depletion of reservoir pressure can have a first order influence on the performance prediction of the reservoir over time.

Thus, there remains a need for an improved method and system for modeling and simulating a fractured reservoir and predicting reservoir performance. In particular, there remains a need for a method and system that can account for the impact on reservoir performance due to the progressive closure of fractures with declining fluid pressure.

SUMMARY

The present disclosure describes methods and systems to enhance subsurface models of fractured reservoirs. In particular, the methods and systems described herein incorporate the effects of "dynamic" compressible fractures and, thus, can improve predictions of fractured reservoir performance over time. The methods and systems may utilize predictive algorithms for mechanical and hydraulic stiffness properties of the fracture network that are based at least in part on a database of measurements derived from single fractures.

The methods for simulating a fractured reservoir may comprise determining a fracture stiffness characteristic;

incorporating the stiffness characteristic into a fracture network model; and incorporating the fracture network model into a reservoir simulator. In some embodiments, the method may further comprise: compiling a database of sample pairs, wherein one sample of each pair is a fractured sample and wherein the other sample of each pair is an unfractured sample; determining the initial open aperture ($b_{M0}$) of the fractured samples; determining the mechanical closure ($\Delta b_M$) of the fractured samples; and using the initial open fracture ($b_{M0}$) and the mechanical closure ($\Delta b_M$) to calculate a mechanical stiffness characteristic ($\chi_M$) of the fractured sample.

BRIEF DESCRIPTION OF THE DRAWINGS

FIG. 6A illustrates the difference in radial strain, with FIG. 6B providing an example of the results of hydrostatic testing of Berea sandstone samples illustrating the difference in the radial strain between intact and fractured (both mated and offset) samples. FIG. 6C illustrates the difference in permeability, with FIG. 6D providing an example of the results of hydrostatic testing of Mancos shale samples having parallel laminations illustrating the difference in the permeability between intact and fractured samples.

FIG. 9A illustrates a scaling of the fracture stiffness characteristic with the initial fracture aperture and FIG. 9B illustrates a roughness-related mechanical to hydraulic aperture conversion.

FIGS. 12A and 12B illustrate hypothetical stresses applied to a fracture network in a DFN model, with FIG. 12A illustrating the far-field total stresses and fluid pressure gradients used to represent variable reservoir depths, and FIG. 12B illustrating a schematic representation of two right-handed rectangular Cartesian coordinate systems illustrating (i) the orientation of fracture plane with respect to a geographic coordinate system and (ii) the orientation of fracture normal vector with respect to the principal stress coordinate system.

DETAILED DESCRIPTION

Figure 1:
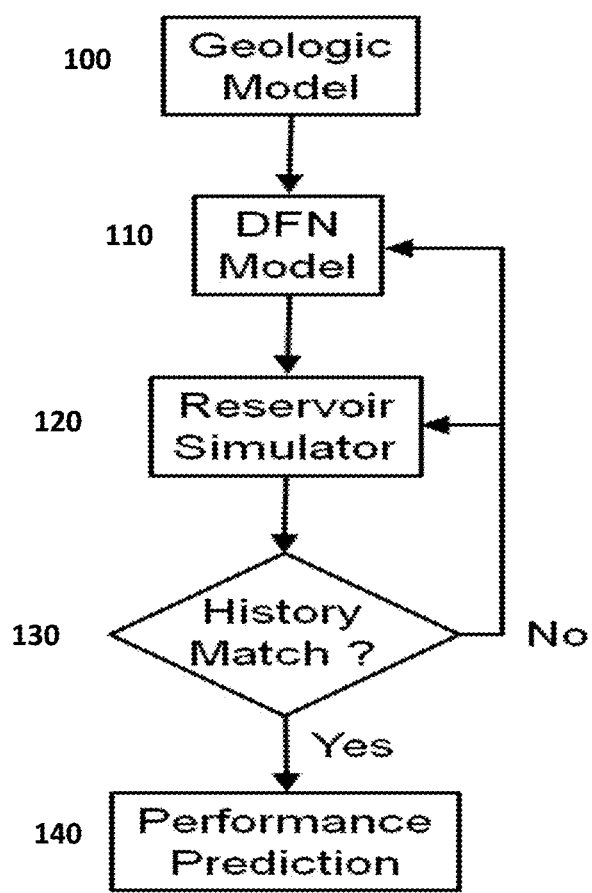
FIG. 1 is a workflow diagram illustrating a method for linking a dual porosity model and a discrete fracture network model.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

As used herein, the "bulk modulus" of a rock sample from a formation relates the change in volume experienced by the sample due to the change in pressure. The bulk modulus is an elastic property of the material and is typically denoted by the symbol κ having units the same as stress. The bulk modulus may be determined by the following formula:

$$\kappa = \frac{3\lambda + 2\mu}{3}$$

As used herein, the force "f" could be compressional, leading to longitudinally compressing the strength member, tensional, leading to longitudinally extending the strength member, or shear, leading to perpendicular to longitudinal translation of the strength member As used herein, "formation" refers to a body or section of geologic strata, structure, or other subsurface solids or collected material that is sufficiently distinctive and continuous with respect to other geologic strata or other characteristics that it can be mapped. A formation can be a body of geologic strata of predominantly one type of rock or a combination of types of rock, or a fraction of strata having substantially common set of characteristics. A formation can contain one or more hydrocarbon bearing subterranean formations. Note that the terms formation, hydrocarbon bearing subterranean formation, reservoir, and interval may be used interchangeably, but may generally be used to denote progressively smaller subsurface regions, zones, or volumes. More specifically, a geologic formation may generally be the largest subsurface region, a hydrocarbon reservoir or subterranean formation may generally be a region within the geologic formation and may generally be a hydrocarbon-bearing zone, a formation, reservoir, or interval having oil, gas, heavy oil and any combination thereof. An interval or production interval may generally refer to a sub-region or portion of a reservoir. A hydrocarbon-bearing zone, or production formation, may be separated from other hydrocarbon bearing zones by zones of lower permeability, such as mudstones, shales, or shale-like (highly compacted) sands.

As used herein, a "fracture" is a crack, delamination, surface breakage, separation, crushing, rubblization, or other destruction within a geologic formation or fraction of formation that is not related to foliation or cleavage in metamorphic formation, along which there has been displacement or movement relative to an adjacent portion of the formation. A fracture along which there has been lateral displacement may be termed a fault. When walls of a fracture have moved only normal to each other, the fracture may be termed a joint. Fractures may enhance permeability of rocks greatly by connecting pores together. Fractures may be natural fractures or may be man-made fractures, such as hydraulic fractures.

As used herein, a "fracture network" refers to a field or network of interconnecting fractures.

As used herein, "hydraulic fracturing" is used to create single or branching fractures that extend from the wellbore into reservoir formations so as to stimulate the potential for production. A fracturing fluid, typically a viscous fluid, is injected into the formation with sufficient pressure to create and extend a fracture. A proppant can be used to "prop" or hold open the created fracture after the hydraulic pressure used to generate the fracture has been released. When pumping of the treatment fluid is finished, the fracture "closes." Loss of fluid to a permeable formation results in a reduction in fracture width until the proppant supports the fracture faces. The fracture may be artificially held open by injection of a proppant material. Hydraulic fractures may be substantially horizontal in orientation, substantially vertical in orientation, or oriented along any other plane. Generally, the fractures tend to be vertical at greater depths, due to the increased magnitude of the vertical stress relative to the horizontal stresses. As used herein, fracturing may take place in portions of a formation outside of a hydrocarbon bearing subterranean formation in order to enhance hydrocarbon production from the hydrocarbon bearing subterranean formation.

As used herein, a "hydraulic fracture" is a fracture at least partially propagated into a formation, wherein the fracture is created through injection of pressurized fluids into the formation.

As used herein, "hydrocarbon production" refers to any activity associated with extracting hydrocarbons from a well or other opening. Hydrocarbon production normally refers to any activity conducted in or on the well after the well is completed. Accordingly, hydrocarbon production or extraction includes not only primary hydrocarbon extraction but also secondary and tertiary production techniques, such as injection of gas or liquid for increasing drive pressure, mobilizing the hydrocarbon or treating by, for example chemicals or hydraulic fracturing the wellbore to promote increased flow, well servicing, well logging, and other well and wellbore treatments.

As used herein, "material properties" represents any number of physical constants that reflect the behavior of a rock. Such material properties may include, for example, Young's modulus, Poisson's Ratio, tensile strength, compressive strength, shear strength, creep behavior, and other properties. The material properties may be measured by any combination of tests, including, but not limited to, ASTM D 2938-95 a "Standard Test Method for Unconfined Compressive Strength of Intact Rock Core Specimens", ASTM D 3967095a a "Standard Test Method for Splitting Tensile Strength of Intact Rock Core Specimens (Brazilian Method)", ASTM D5731-95 a "Standard Test Method for Determination of the Point Load Strength Index of Rock", ASTM D 4435-01 a "Standard Practices for Preparing Rock Core Specimens and Determining Dimensional and Shape Tolerances", ASTM D 3148-02 a "Standard Test Method for Elastic Moduli of Intact Rock Core Specimens in Uniaxial Compression", ASTM D 2664-04 a "Standard Test Method for Triaxial Compressive Strength of Undrained Rock Core Specimens without Pore Pressure Measurements", ASTM D 4405-84 a "Standard Test Method for Creep of Cylindrical Soft Rock Specimens Without Pore Pressure Measurements", ASTM D 5607-95 a "Standard Test Method for Performing Laboratory Direct Shear Strength Tests of Rock Specimens Under Constant Normal Stress".

As used herein, an "overburden" refers to the subsurface formation overlaying the formation containing one or more hydrocarbon-bearing zones (the reservoirs). For example, overburden may include rock, shale, mudstone, or wet/tight carbonate (such as an impermeable carbonate without hydrocarbons). An overburden may include a hydrocarbon-containing layer that is relatively impermeable. In some case, the overburden may be permeable.

As used herein, the "overburden stress" refers to the load per unit area or stress overlaying an area or point of interest in the subsurface from the weight of the overlying sediments and fluids. In general, the magnitude of the overburden stress may primarily depend on two factors: (1) the composition of the overlying sediments and fluids, and (2) the depth of the subsurface area or formation. Similarly, underburden refers to the subsurface formation underneath the formation containing one or more hydrocarbon-bearing zones (reservoirs).

As used herein, "permeability" is the capacity of a formation to transmit fluids through the interconnected pore spaces of the rock. Permeability may be measured using Darcy's Law:

$$Q = \frac{k \Delta P A}{\mu L}$$

where Q is the flow rate ($cm^3$/second); $\Delta P$ is change in pressure, such as the pressure drop (atm) across a cylinder having a length L (cm) and a cross-section area A (cm$^2$); μ is fluid viscosity (cP), and k is the permeability (Darcy). The customary unit of measurement for permeability is the millidarcy. The term "relatively permeable" is defined, with respect to formations or portions thereof, as an average permeability of 10 millidarcy or more (e.g., greater than 10 millidarcy, or greater than 100 millidarcy). The term "relatively impermeable" is defined, with respect to formations or portions thereof, as an average permeability of less than about 10 millidarcy. An impermeable layer generally has a permeability of less than about 0.1 millidarcy.

As used herein, "porosity" is defined as the ratio of the volume of pore space to the total bulk volume of the material expressed in percent. Although there often is an apparent close relationship between porosity and permeability, because a highly porous formation may be highly permeable, there is no relationship between the two. That is, a formation with a high percentage of porosity may be very impermeable because of a lack of communication between individual pores, capillary size of the pore space, or the morphology of structures constituting the pore space.

As used herein, "Poisson's ratio" of a rock sample from a formation is the ratio of a unit of lateral contraction to a unit of longitudinal extension for tension. Poisson's ratio is a dimensionless elastic property of the material, and may be determined by the formula:

$$v = \frac{\lambda}{2(\lambda + \mu)}$$

As used herein, "pressure" and "stress" refers to a force acting on a unit area. Pressure and stress are usually shown as pounds per square inch (psi). "Atmospheric pressure" refers to the local pressure of air, which is assumed to be 14.7 psia at sea level. "Absolute pressure" (psia) refers to the sum of the atmospheric pressure plus the gauge pressure (psig). "Gauge pressure" (psig) refers to the pressure measured by a gauge, which indicates only the pressure exceeding the local atmospheric pressure (i.e., a gauge pressure of 0 psi g corresponds to an absolute pressure of 14.7 psia).

As used here, the "Young's modulus" of a rock sample from a formation is the stiffness of the rock sample, defined as the amount of axial load (or stress) sufficient to make the rock sample undergo a unit amount of deformation (or strain) in the direction of load application, when deformed within its elastic limit. The higher the Young's modulus of a material, the more stress is required to deform the material. The Young's modulus is an elastic property of a material and can be determined by the formula:

$$v = \frac{\mu(3\lambda + 2\mu)}{\lambda + \mu}$$

The present disclosure describes methods and systems to enhance subsurface models of fractured reservoirs. In particular, the methods and systems described herein incorporate the effects of "dynamic" compressible fractures and, thus, can improve predictions of fractured reservoir performance over time. That is, the methods and systems account for changes in fracture size over time, such as the progressive narrowing, i.e., closure, of the fracture apertures due to production-induced drawdown and/or depletion of reservoir pressure over time. The methods and systems may utilize predictive algorithms for mechanical and hydraulic stiffness properties of the fracture network that may be based at least in part on a database of measurements derived from single fractures. That is, the present methods may comprise upscaling single fracture laboratory measurements to fracture network predictions of fracture compressibility and permeability reduction as data input for direct simulation or material balance forecasts of stress-sensitive fractured reservoir performance.

Figure 2:
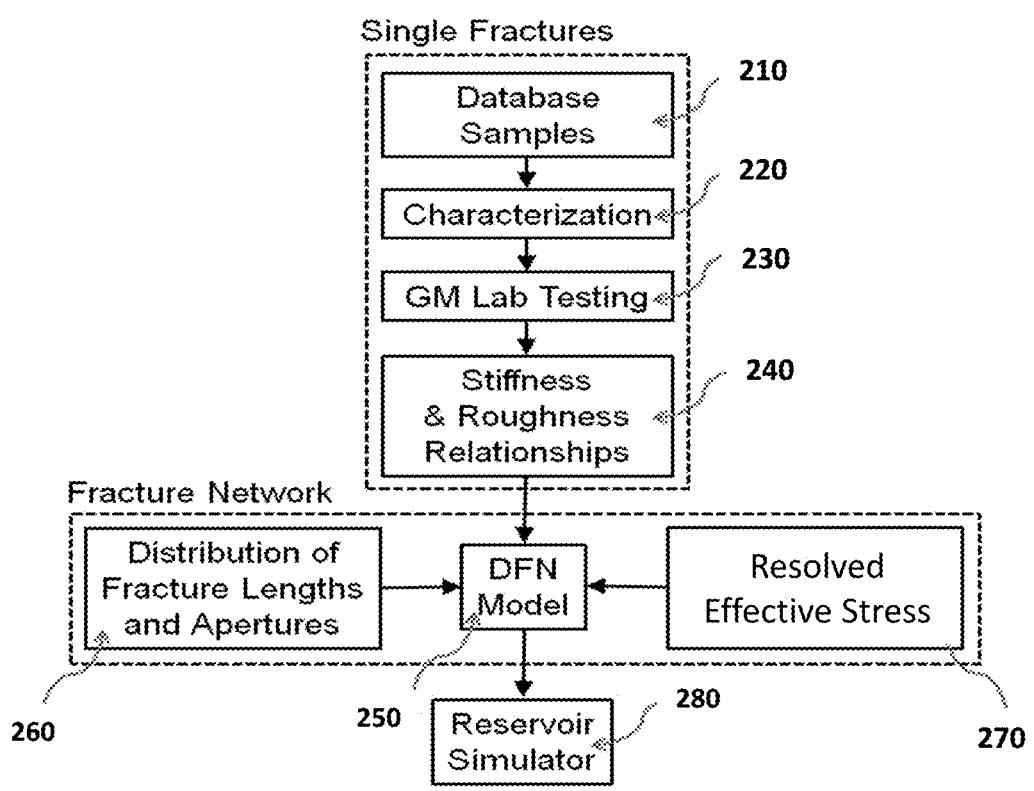
FIG. 2 is a workflow diagram illustrating a method for incorporating compressible fractures into a reservoir simulator model.

FIG. 2 is a workflow diagram illustrating embodiments of the methods and systems described herein. Functional relationships are derived in block 240 that can be used to predict the effects of fracture stiffness and roughness. A DFN model 250 is then rendered that incorporates the functional relationships derived in block 240, a distribution of fracture lengths and apertures 260, and resolved effective stress 270. The DFN model 250 can then be incorporated into a reservoir simulator 280. In some embodiments, the reservoir simulator may be a dual porosity reservoir simulator. In some embodiments, the simulator 280 may be validated through well production data. The simulator 280 may then be run in a forecast mode to predict the performance of the reservoir.

At block 210 of FIG. 2 a collection or database of samples is assembled. The collection should include sets of samples from the same host rock lithology that include both intact samples and fractured samples. For example, a set of samples may be a pair of samples from the same host rock lithology where one sample is an unfractured, intact, core plug and the other sample is a fractured core plug. The collection of samples 210 ideally includes a mixture of clastic, carbonate, and/or mudrock fine-grained rock types. For example, in some embodiments the samples may include a range of fine-grained rock types such as Berea sandstone, Indiana limestone, Austin chalk, pink granite, Mancos shale, and the like. However, it is not necessary that the lithologies of rock represented in the collection of samples 210 be representative of the particular reservoir of interest or include all lithology types. The measurements made on the intact samples can be used to relate the properties of the lithology/intact matrix material, while the measurements made on the fractured samples can be used to represent a convolution of the intact matrix material properties and properties of the fracture incorporated within the sample.

Figure 3A:
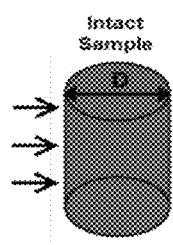
FIGS. 3A, 3B, 3C, and 3D illustrate sample geometries of core plug samples.
Figure 3B:
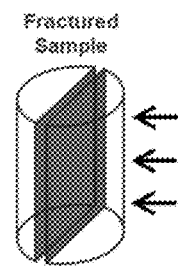
Figure 3C:
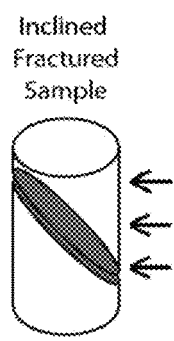
Figure 3D:
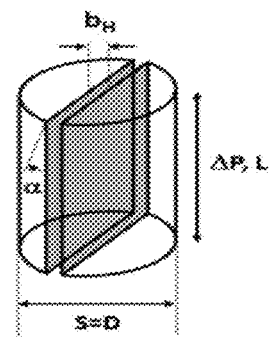

Exemplary sample geometries are illustrated in FIGS. 3A, 3B, 3C, and 3D. FIG. 3A illustrates an intact sample. As seen in FIG. 3A, the preferred core plug sample is a right cylinder with a diameter D. FIGS. 3B and 3C illustrate fractured samples. As seen in FIG. 3B, a preferred fractured sample is a right cylinder where the plane of the fracture is positioned centrally within the core plug and where the fracture is oriented perpendicular to the flat and parallel end-faces of the sample. FIG. 3C provides an example of a fractured sample with the plane of fracture at an incline, where the core plug is a right cylinder and the plane of fracture is at an angle relative to the plug axis of from greater than 0° to less than 90°, with preferred angles being from about 15° to about 45°. FIG. 3D illustrates the nomenclature that may be used to describe the permeability measurements in the fractured sample. As seen in FIG. 3D, S is the diameter D, α is the angle between the plane of the fracture and the pressure gradient, $b_H$ is the fracture aperture, and ΔP is the change in pressure along the length L of the sample.

In some embodiments, the fractured samples may be limited to those that contain pure tensile opening mode fractures commonly referred to as "joints." See Shultz et al., "Terminology for Structural Discontinuities", *AAPG Bulletin*, 92(7), pp 853-867 (2008).

The fractured samples may be artificial tensile fractures or may be natural fractures collected from outcrop or core samples. If the fractures are natural fractures, it is important that the natural fracture is not fully occluded with diagenetic cements, but instead exhibits only partial fracture fill. See Laubach, "Practical Approaches to Identifying Sealed and Open Fractures," *AAPG Bulletin* 87(4), pp 561-579 (2003). If the fractures are artificial tensile fractures, they may be those created in a laboratory through application of a compressive line load.

In some embodiments, the fractured samples contain artificially induced single fractures. The fracture may be parallel or perpendicular to laminations. For example, an intact sample such as that in FIG. 3A may be subjected to a compressive line load using the "Brazilian" technique to form an opening mode tensile fracture oriented axially in the cylinder as seen in FIG. 3B. In preferred embodiments, it may be desirable to utilize a mated and an offset fracture for the testing of each rock type such that larger unstressed apertures can be evaluated by systematically offsetting the two specimen halves from the initial mated condition prior to pressurizing. Utilizing the "Brazillian" technique, it may be possible to generate fractures with initial apertures that span from a few tens of microns to a few millimeters. Larger open apertures can also be generated in the artificially fractured core samples by systematically offsetting the two specimen halves from the initial mated condition.

Figure 4A:
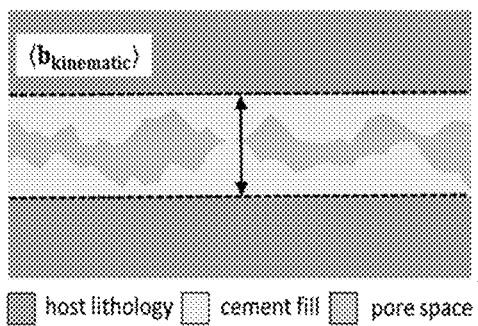
FIGS. 4A, 4B, and 4C illustrate schematic representations of fracture samples, with FIG. 4A illustrating a natural fracture with kinematic aperture and present-day pore space, FIG. 4B illustrating an artificial fracture with open aperture, and FIG. 4C illustrating a proppant filled partially cemented fracture.
Figure 4B:
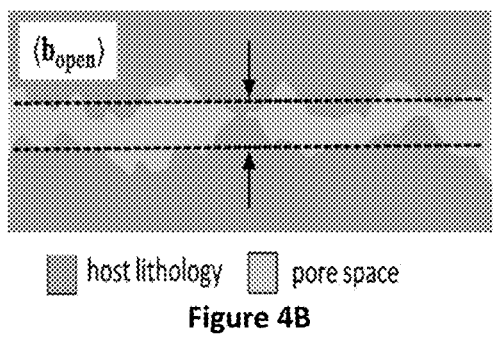
Figure 4C:
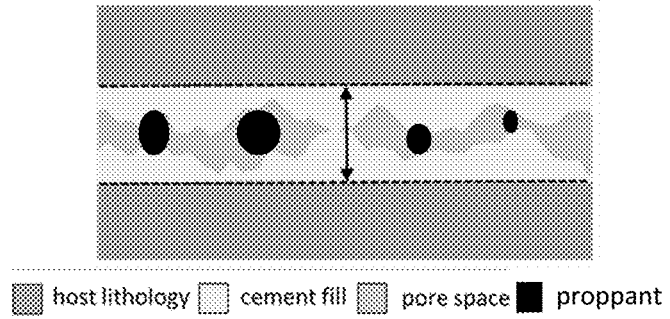

The fracture in each sample can be quantified or rationalized with respect to the aperture and pore volume through Equation 1:

$$\langle b_{open} \rangle = \langle b_{kinematic} \rangle \frac{(100 - \text{cement \%})}{100} \quad \text{Equation 1}$$

where $\langle b_{open} \rangle$ is the average value of the open aperture (i.e., present day pore space), $\langle b_{kinematic} \rangle$ is the average value of the kinematic aperture (i.e., how far the fractured walls have moved apart), and cement % is the percentage of cement fill. FIGS. 4A, 4B, and 4C provide an illustration of how the open aperture and the kinematic aperture can be determined. FIG. 4A illustrates a fracture that has been partially filled with cement, for example a natural fracture that is partially filled with cement or a hydraulic fracture that has propagated along a previously-cemented fracture. As seen in FIG. 4A the kinematic aperture is the widest distance between the walls of the fracture that is orthogonal to the fracture face and indicate how far apart the fractured walls have moved. FIG. 4B illustrates an artificial fracture or a natural dissolution fracture. As seen in FIG. 4B, the open aperture is a measurement of the open pore pace between the fracture walls. FIG. 4C is an illustration of a proppant filled fracture. When the fracture is a proppant filled fracture, Equation 1 may be modified to include the proppant % as shown in Equation 1A:

$$\langle b_{open} \rangle = \langle b_{kinematic} \rangle * \frac{(100 - \text{cement \%})}{100} * \frac{(100 - \text{proppant \%})}{100} \quad \text{Equation 1A}$$

Once the collection of samples is obtained at block 210 of FIG. 2, the samples are characterized at block 220 of FIG. 2. The characterization may include measuring mechanical properties of each sample. For example, the static bulk modulus "K", Yong's modulus "E", and unconfined compressive strength "UCS" of each sample may be measured. The characterization may also include a measurement of the initial open aperture of the fractured sample. The characterization may also include a profilometry of the fracture face, for example to give an indication of the roughness of the fracture.

Figure 5A:
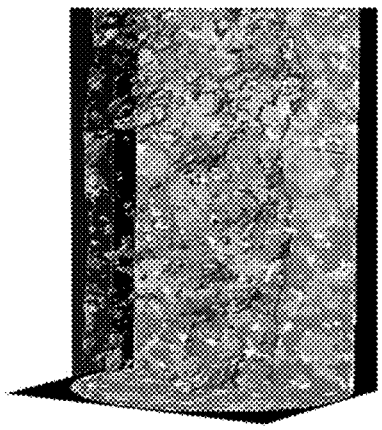
FIGS. 5A, 5B, and 5C illustrate the characterization of a fractured granite sample at an initial unstressed condition, with FIG. 5A illustrating a processed 3D image of a mated fracture, FIG. 5B illustrating a processed 3D image of an offset fracture, and FIG. 5C illustrating a histogram of the average apertures derived from the 2D slices that constitute the 3D images in FIGS. 5A and 5B.
Figure 5B:
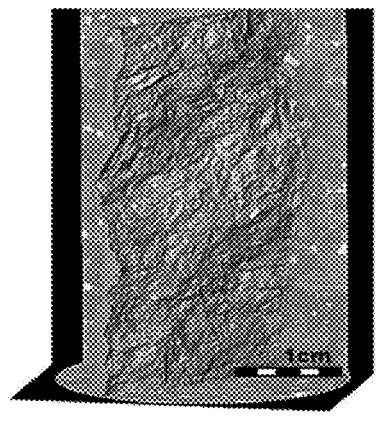
Figure 5C:
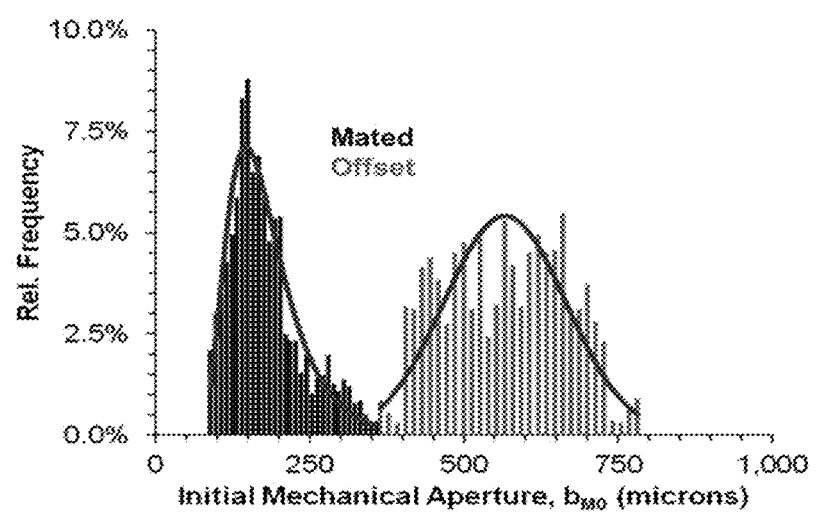

An X-ray computed tomography ("X-ray CT") scan can be conducted on the samples to characterize the fractured samples. That is, the X-ray CT scan can be used to quantify the initial open aperture of the fractured sample using image analysis techniques. For example, the X-ray CT scan can be used to characterize each sample so that a three-dimensional ("3D") image of each initial unstressed fracture can be generated using image analysis software. An example of a processed 3D fracture image at initial unstressed condition is seen in FIGS. 5A and 5B, with FIG. 5A illustrating a 3D image of a fractured granite sample having a mated fracture and FIG. 5B illustrating a 3D image of a fractured granite sample having an offset fracture. This characterization can be used to quantify an average open fracture aperture, i.e., the initial, unstressed mechanical aperture, "$b_{MO}$". For example, an average aperture can be determined from each of a series of two-dimensional ("2D") slices that constitute the 3D fracture image, for example the average aperture may be an arithmetic mean, the median, the mode, or another representation of the central value of the aperture. As seen in FIG. 5C, the "$b_{MO}$" is defined as the median 50% probability (P50) value. Thus, as seen in FIG. 5C, a histogram of the average apertures derived from the 2D slices that constitute the 3D image, with the initial, unstressed mechanical aperture "$b_{MO}$" being the central (P50) value. This tomographic measurement of the initial, unstressed mechanical aperture "$b_{MO}$" can be equated with the open aperture $\langle b_{open} \rangle$ of FIG. 4B and Equation 1.

After the initial characterization at block 220 in FIG. 2 of the fractured core samples, the samples (preferably both the intact and fractured samples) are subjected to geomechanical testing at block 230 in FIG. 2. For example, conventional geomechanical testing equipment and procedures can be used to increase the effective hydrostatic pressure on the sample to induce the effective fracture normal stress and shear stress (σ'=PC–PP, where σ' is the effective hydrostatic pressure, PC is the external confining pressure, and PP is the internal pore pressure) while measuring the resultant change in the specimen radial strain using standard geomechanical instrumentation such as strain-gauged extensometers or linear variable differential transformers. That is, each sample may be subjected to a maximum effective compression, such as σ'=10,000 psi, while measuring the resultant change in the sample's radial strain via extensometers mounted directly on the sample. The physical reduction in the fracture aperture, i.e., the mechanical closure "$\Delta b_M$" can be determined from the measured difference between compression curves generated from testing of the intact and fractured samples from a common rock type. The axial permeability may also be determined during the geomechanical test using well-established equipment and techniques. The difference in mechanical (radial strain "ϵ") and hydraulic (permeability "k") measurements between the intact and fractured specimens in a sample pair (i.e., a pair of samples having a common host rock lithology) is then used to calculate fracture closure as a function of increasing effective stress (σ'=PC–PP) as illustrated in the geomechanical measurement difference curves in FIGS. 6A and 6C.

Figure 6A:
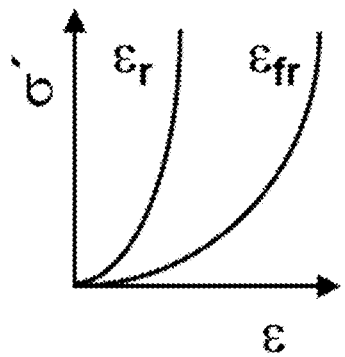
FIGS. 6A, 6B, 6C, and 6D illustrate difference curves of geomechanical properties of a sample pair (i.e., an intact sample and a fractured sample).

FIG. 6A illustrates the difference in strain ($\epsilon$) between the intact specimen ($\epsilon_r$) and the fractured specimen ($\epsilon_{fr}$) which can be used to provide a measure of the mechanical fracture closure ($\Delta b_M$). Thus, FIG. 6A illustrates the physical reduction (i.e., closure) in the fracture aperture which is the mechanical closure ($\Delta b_M$), which can be directly determined from the measurement of strain. See Goodman, "Methods of Geological Engineering in Discontinuous Rocks", West Publishing Company (1976). In the case where no shear stress is applied to the fracture, the reduction in the mechanical aperture can then be related to increasing normal stress ($\sigma'$) via the fracture normal stiffness "$\kappa$" using Equation 2:

$$\kappa = \frac{\sigma'}{\Delta D(\text{fractured sample}) - \Delta D(\text{intact sample})} = \frac{\sigma'}{\Delta b_M} \qquad \text{Equation 2}$$

Thus, the mechanical aperture at a given normal stress magnitude can be calculated from the initial, unstressed, open aperture (as determined from the X-ray CT characterization) and the closure (as determined from geomechanics testing) using Equation 3:

$$b_M(\sigma') = b_{M0} - \Delta b_M = b_{M0} - \frac{\sigma'}{\kappa} \qquad \text{Equation 3}$$

For the case where shear stresses are applied in addition to normal stress, the reduction in mechanical aperture as a function of both normal and shear stresses may still be related to the total resolved stresses on a fracture by a variant of the fracture normal stiffness using alternative formulations of Equations 2 and 3 which account for the additional closure due to the inclusion of shear stress. This alternative formulation of Equations 2 and 3 may include additional dependencies of the fracture stiffness beyond what is required for the zero resolved shear stress case. For example, this alternative formulation may include the effects of matrix (rock) attributes such as stiffness parameters like Young's modulus and Poisson's ratio, fracture attributes such as measures of fracture length, aperture or roughness or other relevant parameters.

Figure 6B:
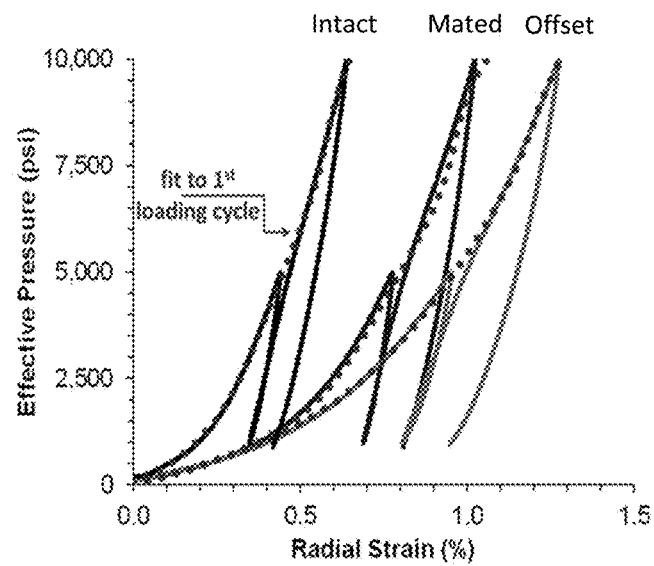

FIG. 6B provides an example of the results of hydrostatic testing of Berea sandstone samples. As seen in FIG. 6B, a difference in the radial strain between the intact and fractured (both mated and offset fractures) provide a measure of the mechanical aperture closure.

Figure 6C:
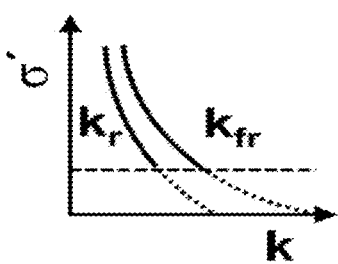
Figure 6D:
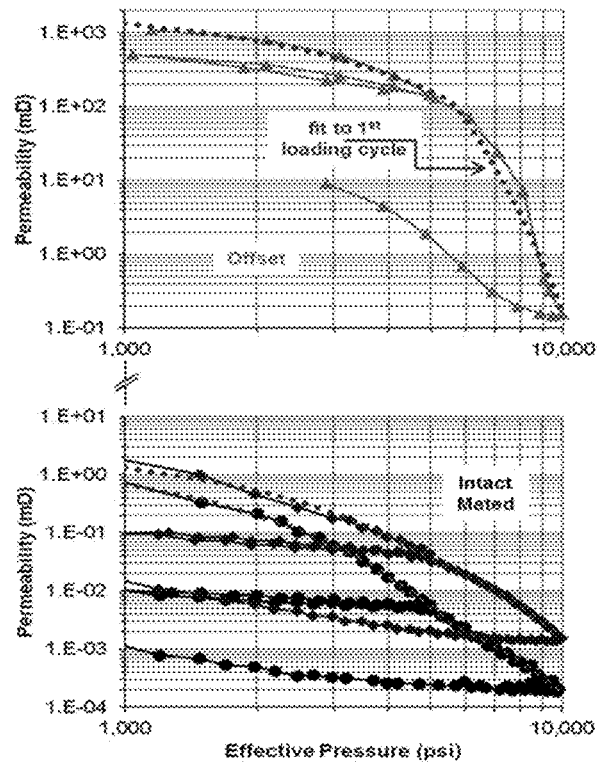

In addition to the determination of the mechanical aperture, permeability measurements can be made throughout the duration of each geomechanical test. For example, permeability measurements can be made using a combination of steady-state and transient techniques depending on the permeability magnitude in order to calculate an equivalent stress-sensitive "hydraulic" aperture "$b_H(\sigma')$". Thus, as illustrated in FIG. 6C the hydraulic fracture permeability "$k_H$" can be calculated from the measured permeability difference between the fractured "$k_{fr}$" and intact "$k_r$" samples. FIG. 6D provides an example of the results of hydrostatic testing of Mancos shale samples having fractures parallel to laminations. As seen in FIG. 6D the difference in the permeability between the intact and fractured specimens provides a measure of the hydraulic aperture reduction.

The simplest model for fluid flow in a rock fracture is the idealized "parallel plate" model, see e.g., Witherspoon et al. "Validity of Cubic Law for Fluid Flow in a Deformable Rock Fracture", *Water Resour. Res.* 16(6), pp 1016-1024 (1980), from which the "cubic law" relationship between fracture transmissivity "T" (i.e., the product of permeability and cross-sectional area open to flow) and fracture aperture is derived. However, this dependence is only valid for an idealized representation of fracture walls as two smooth parallel plates and fluid flow in real fractures can deviate significantly from the idealized "parallel plate" model due to effects from the wall-rock surface roughness and effects associated with finite asperity contact area between opposing fracture walls. See Zimmerman et al. "Hydraulic Conductivity of Rock Fractures", *Transport in Porous Media* 23(1), pp 1-30 (1996).

Figure 7:
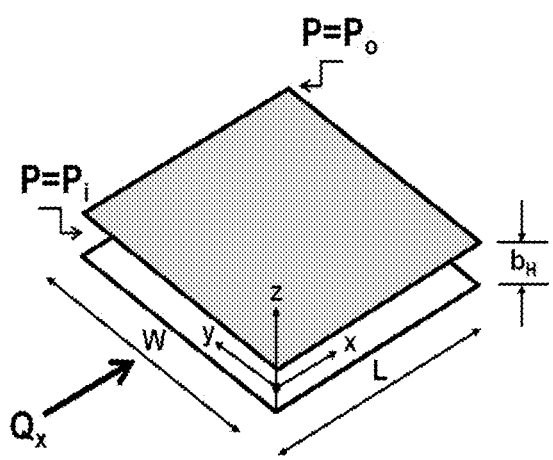
FIG. 7 illustrates the parallel plate model for fractures.

FIG. 7 illustrates the idealized geometry for derivation of the cubic law assuming fracture walls are represented by two smooth, parallel plates separated by an aperture, "$b_H$". Thus, as seen in FIG. 7, uniform pressures ("$P_I$" and "$P_O$") are imposed on two opposing faces of the fracture or alternatively a constant flux (Q) is imposed. The magnitude of the average pressure gradient is ($P_I$-$P_O$)/L in the x-direction (i.e., the direction parallel to the pressure gradient) and the total volumetric flux through the fracture for a width "w" in the y-direction (i.e., the direction perpendicular to the pressure gradient and the parallel plate) can be used to calculated fracture permeability by integrating the velocity across the fracture from z=$-b_H$/2 to z=+$b_H$/2, such that the relationship between the fracture permeability "$k_H$" and the hydraulic aperture "$b_H$" is given by Equation 4:

$$T = k_H A = \frac{w b_H^3}{12},$$

$$\therefore k_H = \frac{b_H^2}{12} \qquad \text{Equation 4}$$

However, due to the consequences of real fracture surface roughness and finite contact area, it is preferable to directly measure flow properties (transmissivity and permeability) as a function of stress (see Nelson et al "Experimental Study of Fracture Permeability in Porous Rock", *AAPB Bulletin* 61(2), pp. 227-236 (1977); see also, Engelder et al. "Fluid Flow Along Very Smooth Joints at Effective Pressures Up to 200 Megapascals", *Mechanical Behavior of Crustal Rocks*, Geophysics Monograph Volume 24, pp. 147-152 (1981)) and use the cubic law in Equation 4 to derive an equivalent hydraulic aperture ("$b_H$") rather than relying on the strain-based measurement of mechanical aperture to determine an equivalent fracture flow response. For example, for the schematic fractured sample geometry of FIG. 3D using Equation 5, the fracture permeability "$k_H$" can be calculable from the measured permeability difference between fractured "$k_{fr}$" and intact "$k_r$" sample pairs as illustrated in FIG. 6C.

$$k_H = \frac{1}{\sqrt[3]{12}} \left[ \frac{(k_{fr} - k_r)S}{\cos^2 \alpha} \right]^{2/3} \qquad \text{Equation 5}$$

In Equation 5, "$\alpha$" represents the angular deviation between the plane of the fracture and the pressure gradient and fracture spacing "S", which is assumed to be equivalent to the sample diameter "D". This then enables direct determination of the hydraulic aperture by substitution of Equation 5 into Equation 4, while noting that the initial, unstressed hydraulic aperture "$b_{HO}$" is not directly measured, as it is impossible to flow fluids through an effectively unconfined sample where PC=0, but is instead derived by numerically extrapolating "$k_{fr}$" and intact "$k_r$" permeabilities measured at a range of finite effective stresses back to zero stress conditions as illustrated schematically in FIG. 6C. Thus, the equivalent hydraulic aperture can then be derived from the measured fracture permeability as in Equation 5A:

$$b_H(\sigma') = \sqrt{12k_H} = \left[\frac{(k_{fr} - k_f) \cdot 12S}{\cos^2\alpha}\right]^{1/3} \quad \text{Equation 5A}$$

where "$\alpha$" represents the angular deviation between the plane of the fracture and the pressure gradient as seen in FIG. 3D and fracture spacing "S", which is assumed to be equivalent to the sample diameter "D" in FIG. 3D. In Equation 5A, the initial hydraulic aperture "$b_{HO}$" is obtained by extrapolating the measured intact and fracture permeabilities to zero stress conditions.

The measurements of effective stress dependent mechanical and hydraulic aperture can then be used to generate functional relationships (see block 240 of FIG. 2) to predicting fracture stiffness and roughness effects.

Figure 8A:
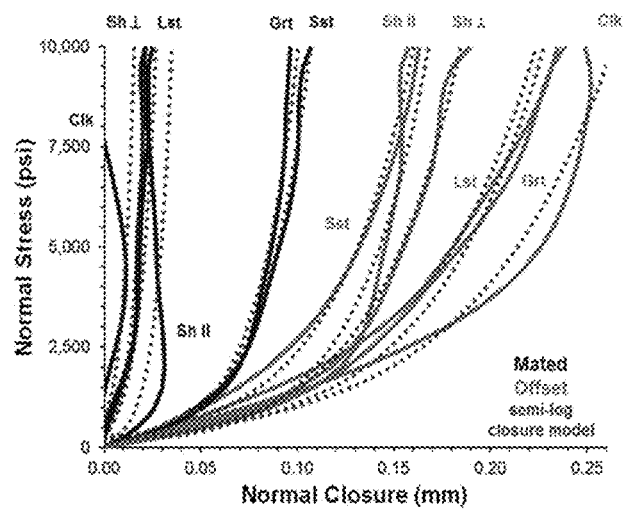
FIGS. 8A and 8B illustrate the fracture normal stress versus closure with a best-fit semi-log function, with FIG. 8A showing the mechanical aperture derived from radial strain and FIG. 8B showing the hydraulic aperture derived from permeability.
Figure 8B:
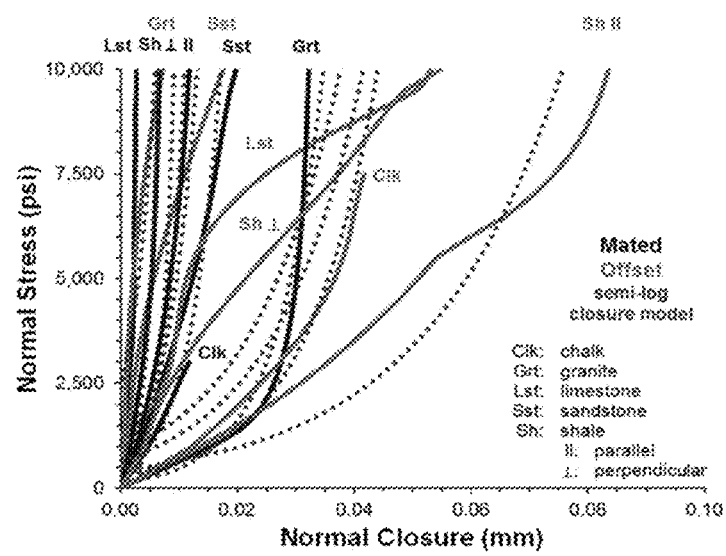
Figure 8C:
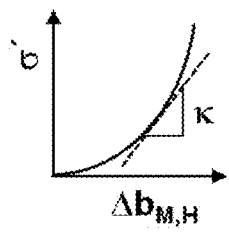
FIGS. 8C and 8D illustrate the stiffness relationship, with FIG. 8C illustrating the stress-dependent nature of fracture normal stiffness and FIG. 8D illustrating a linear fracture normal stiffness as compared to stress for a semi-logarithmic closure.

In the case with zero shear stress, predicting fracture normal stiffness "$\kappa$" enables closure "$\Delta b$" to be calculated from knowledge of the increasing normal stress "$\sigma'$". However, this procedure is complicated by the fact that fracture normal stiffness itself is observed to be strongly stress-dependent during initial fracture loading (for example during primary reservoir depletion and as seen in FIGS. 8A, 8B, and 8C) requiring that closure versus stress curves be fit using a mathematical function. FIGS. 8A and 8B illustrate an example of the progressive reduction in the mechanical and hydraulic aperture with increasing effective normal stress for the first hydrostatic loading cycle of fractured samples. The "concave upwards" nature of the closure curves in FIGS. 8A and FIG. 8B is indicative of pronounced stress-dependency in the fracture normal stiffness. As seen in FIGS. 8A and FIG. 8B the experimental data can be fit using a semi-logarithmic function in which the closure varies linearly with the natural logarithm of normal stress. This is illustrated in FIG. 8C which shows an idealized normal stress-dependent nature of fracture stiffness.

Several fracture closure laws have been proposed in the literature: see Goodman, "Methods of Geological Engineering in Discontinuous Rocks", West Publishing Company (1976), which describes an empirical hyperbolic relationship containing two free parameters; see the semi-logarithmic function proposed by Bandis et al. in "Fundamentals of Rock Joint Deformation", *International Journal of Rock Mech. Min. Sci. and Geomech. Abstr.*, 20(6), pp 249-269 (1983)) in which closure varies linearly as the logarithm of normal stress contains only one free parameter termed the stiffness characteristic "$\chi$" where the constant $\chi=d\kappa/d\sigma'$; and see Zangerl et al, "Normal stiffness of fractures in granitic rock: A compilation of laboratory and in-situ experiments", *Int. J. Rock Mech. Min. Sci.* 45(8), pp 1500-1507 (2008)). In semi-logarithmic closure laws the predicted change in mechanical aperture resulting from a change in effective normal stress from an arbitrary reference value "$\sigma^{ref}$" can be given by Equation 6:

$$\Delta b = \frac{1}{\chi} \ln\left(\frac{\sigma'}{\sigma^{ref}}\right); \quad \text{Equation 6}$$

$$\therefore \ln(\sigma') = \chi \cdot \Delta b + \ln(\sigma^{ref})$$

Although closure laws have generally been derived for describing changes in mechanical aperture (from strain measurement) it can be appreciated that the same laws can be fit to closure of hydraulic aperture (from flow measurement). This is illustrated in FIG. 8B which illustrates the hydraulic aperture derived from permeability.

Thus, regression techniques can be used to fit the linear form of the semi-log closure law (Equation 6) to experimental data for primary loading (either strain-derived or flow-derived measurement of fracture closure designated "$\Delta b_M$" and "$\Delta b_H$" respectively) in order to quantify statistically the best-fit stiffness characteristic (both mechanical "$\chi_M$" and hydraulic "$\chi_H$"). While the slope of this linear fit represents the stiffness characteristic, the intercept represents the natural logarithm of the reference normal stress "$\sigma^{ref}$" that is the effective normal stress level at the start of the test (the "setup" stress when $\Delta b=0$).

Figure 8D:
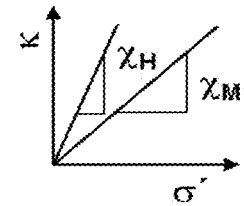

For the semi-logarithmic closure law it can be shown (see Zangerl et al., "Normal stiffness of fractures in granitic rock: A compilation of laboratory and in-situ experiments", *Int. J. Rock Mech. Min. Sci.*, 45(8), pp. 147-152, 2008) that the curve of normal stiffness versus effective normal stress is linear and passes through the origin (i.e. zero stiffness at zero normal stress) as illustrated schematically in FIG. 8D so that:

$$\kappa = \left(\frac{d\kappa}{d\sigma'}\right)\sigma' = \chi \cdot \sigma' \quad \text{Equation 7}$$

From Equation 7 it can be seen that for a given arbitrary normal stress level, the lower the value of stiffness characteristic the relatively more compliant the fracture. Thus, the methods described herein can be used to predict "$\kappa$" and, thus, calculate fracture stiffness "$\chi$" using Equation 7 for any known magnitude of normal stress "$\sigma'$" which in turn enables fracture closure "$\Delta b$" to be calculated from the semi-logarithmic relation given by Equation 6.

In contrast, when considering unloading or reloading of a fracture (for example during fluid injection in the field), the fracture normal stiffness "$\kappa$" is not observed to be as strongly stress dependent (as seen in FIGS. 6B and 6D). Thus, in this case the fracture normal stiffness may be approximated as constant with respect to effective normal stress allowing for calculation of fracture closure "$\Delta b$" to be derived directly from Equation 3 without requiring the calculation of fracture stiffness "$\chi$". The constant fracture normal stiffness may be obtained by using regression techniques to fit the experimental unloading or reloading data. Alternatively, the fracture normal stiffness may be held constant and equal to the largest value it has attended during primary loading.

The results of the characterization at block 220 of FIG. 2 and geomechanical lab testing at block 230 of FIG. 2 of the collection of samples at block 210 of FIG. 2 can then be used to generate a functional relationship between, in the case of normal closure, measured values of stiffness characteristic "$\chi$" and an associated fracture attribute at block 240 in FIG. 2. For example, the functional relationship may relate the stiffness characteristic (as a dependent variable) with the initial unstressed fracture aperture "$b_0$" (as an independent variable), where the aperture may be derived from visual estimation of kinematic aperture and present-day pore space as shown in FIG. 4. The functional relationship can be represented by a power-law correspondence between initial aperture and stiffness characteristic as shown in FIG. 9A.

Figure 9A:
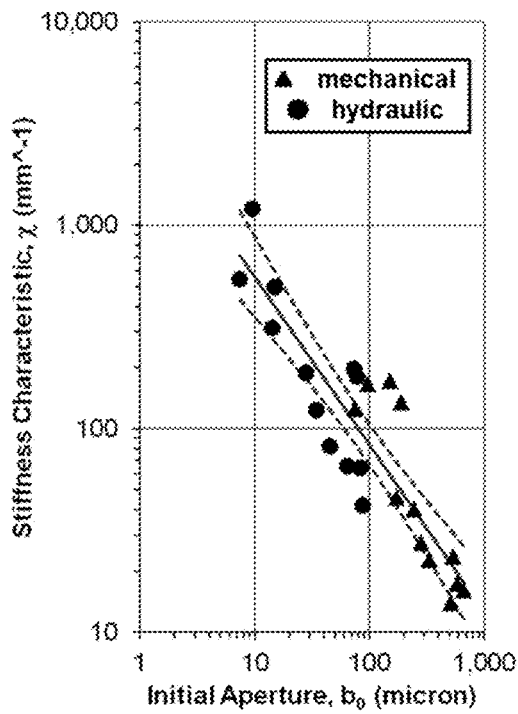
FIGS. 9A and 9B are a schematic representation of a stiffness and roughness relationship exhibited by fractures. Where

In FIG. 9A the points represent measured values (in this example derived from intact and fractured database plug pairs with synchronous measurement of strain and flow) and the straight line an associated inverse power-law functional relationship (generated using standard regression techniques). As seen in FIG. 9A it is apparent that measured values of initial mechanical aperture are systematically greater than those of initial hydraulic aperture due to roughness and contact effects. However, it is also evident that measured stiffness characteristic magnitude "$\chi_M$" associated with closure of mechanical aperture is systematically less than the equivalent "$\chi_H$" as derived from hydraulic flow measurement such that all (mechanical and hydraulic) data is fit using the same functional relationship.

The functional relationship illustrated schematically in FIG. 9A can therefore be used to predict the appropriate χ-magnitude from knowledge of the initial unstressed mechanical aperture "$b_{M0}$". While this functional relationship can be generated from direct measurement of "$b_{M0}$" using X-ray computed tomography as described above, simple visual inspection of core can also be used to derive an initial "$b_{M0}$" value in order to predict a corresponding χ-magnitude once this functional relationship has been generated from database measurements. Also (with the exception of the idealized parallel plate approximation) the initial unstressed mechanical aperture "$b_{M0}$" is always of greater magnitude than the equivalent initial unstressed hydraulic aperture "$b_{H0}$" due to surface roughness and contact effects. Thus, simple visual inspection of core cannot be used to predict an initial $b_{H0}$-magnitude without knowledge of an additional functional relationship between mechanical and hydraulic aperture. However, simple visual inspection combined with an estimate of a joint roughness coefficient ("JRC") as described below, can be used to estimate an initial unstressed hydraulic aperture. Similarly, an estimate of joint roughness coefficient may be used to estimate mechanical aperture if the hydraulic apertures are taken from a DFN that has been calibrated to some measurement of field performance (for example, a well interference test) are available.

Thus, as seen in FIG. 9A a strong inverse power-law relationship exists between the stiffness characteristic and the initial unstressed aperture for both mechanical and hydraulic closure. For the samples tested, this relationship appears to exist regardless of rock type. As such, the stiffness characteristic "χ" can be wholly equated with the inverse of the standard deviation of a measure of the surface roughness, which implies that initially larger aperture fractures are rough and relatively more compliant.

As mentioned above fracture normal stiffness "κ" as defined in Equations 2 and 3 is only directly applicable in the case where there is zero resolved shear stress on a fracture. In the case of non-zero resolved shear stress on a fracture an alternative formulation must be developed. In a similar way the stiffness characteristic "χ" defined above in Equation 7 applies only to the case with zero resolved shear stress due to its dependence on fracture normal stiffness thus necessitating the development of an alternative expression in order to be applied in the case of non-zero resolved shear stress. As in the case of the fracture normal stiffness, this alternative definition may include matrix (rock) attributes such as stiffness parameters like Young's modulus and Poisson's ratio, fracture attributes such as measures of fracture length, aperture or roughness or other relevant parameters and would allow the framework outlined above to be used more broadly in the calculation of fracture closure.

Figure 9B:
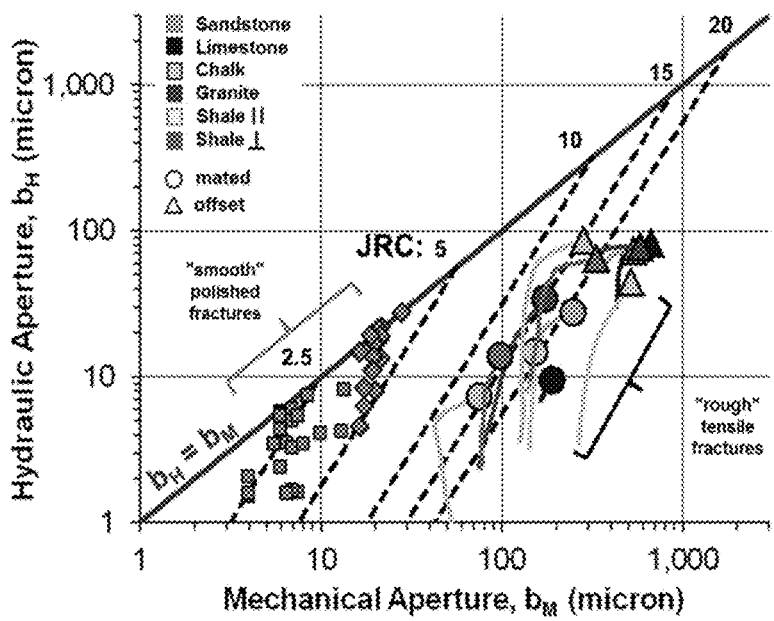

FIG. 9B illustrates a plot of the measured hydraulic versus mechanical aperture for relatively rough-walled tensile fractures. In FIG. 9B, the solid symbols represent initial unstressed measurements and the "tails" indicate the subsequent reduction associated with increasing normal stress. Additional laboratory measurements of relatively smooth-walled surface ground fractures are also shown in FIG. 9B for comparative purposes, where the squares represent saw-cut Barre granite (see Kranz et al., "The permeability of whole and jointed Barre granite", *Int. J. Rock Mech. Min. Sci. & Geomech. Abstr.*, 16(4), pp. 225-234 (1979)), and the diamonds represent Cheshire quartzite (see Engelder et al., "Fluid flow along very smooth joints at effective pressures up to 200 megapascals", *Mechanical Behavior of Crustal Rocks*, Geophys. Monogr. Vol. 24, pp. 147-152 (1981)). Thus, as seen in FIG. 9B, it can be observed from the measured data, including both rough- and smooth-walled fractures, that the functional relationship can be represented by Equation 8 which incorporates a single roughness term:

$$b_H = \frac{JRC^{2.5}}{(b_M/b_H)^2} = \frac{b_M^2}{JRC^{2.5}} = \quad \text{Equation 8}$$

However, it should be noted that Equation 8 is only valid for $b_M \geq b_H$ (apertures in units of micrometers) and that "JRC" represents the "joint roughness coefficient". See Barton & Choubey, "The shear strength of rock joints in theory and practice", *Rock Mech.*, 10(1), pp. 1-54 (1977).

Thus in FIG. 2, laboratory testing at block 230 may be used to generate and predict normal and shear fracture stiffness stress dependence at block 240, which can be incorporated and implemented in a DFN model 250 in order to assess the relative stress-sensitivity of a fracture network's compressibility and flow. Accordingly, in some embodiments, the methods described herein would comprises (i) using the initial fracture aperture geometric attribute "$b_{M0}$" to predict the mechanical stiffness characteristic "$\chi_M$" of a fracture; (ii) using the mechanical stiffness characteristic "$\chi_M$" to predict fracture stiffness "κ" for any desired normal stress magnitude "σ'", for example from Equation 7; (iii) using the "$b_{M0}$", "κ" and "σ'" to predict a stress-dependent mechanical aperture "$b_M(\sigma')$", for example from Equation 3; (iv) using an additional functional relationship (for example sourced from the literature or generated from the database of measurements as described herein) to convert from mechanical aperture "$b_M(\sigma')$" to an equivalent hydraulic aperture "$b_H(\sigma')$".

The fracture population of interest is then rendered within a DFN model at block 250 of FIG. 2 using established techniques. For example, relationships between fracture size and frequency (such as those described in Cladouhos & Marrett, "Are fault growth and linkage models consistent with power-law distributions of fault lengths", *J. Struct. Geol.*, 18 (⅔), pp. 281-293 (1996)) can be utilized in order to realistically represent fracture length distributions within the DFN model. Also, measured aperture versus length correlations (such as those described in Klimczak et al, "Cubic law with aperture-length correlation: implications for network scale fluid flow", *Hydrogeology Journal*, 2010) can be utilized to realistically represent fracture aperture distributions within the DFN model at block 260 of FIG. 2. Alternatively, fracture aperture distributions can be generated to fit production history or well test data and then be incorporated in the DFN.

Figure 10:
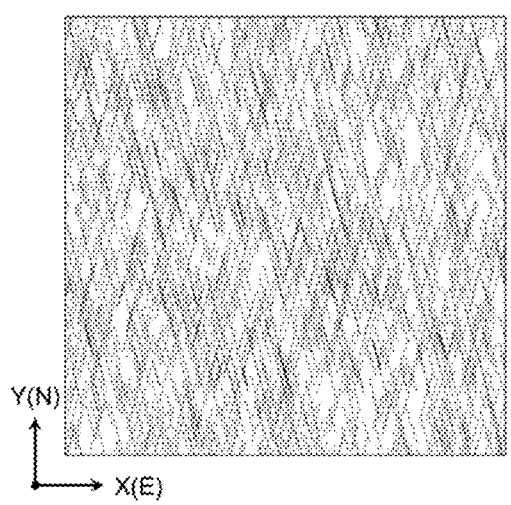
FIG. 10 is an example of a DFN model cell setup illustrating two fracture sets.
Figure 11A:
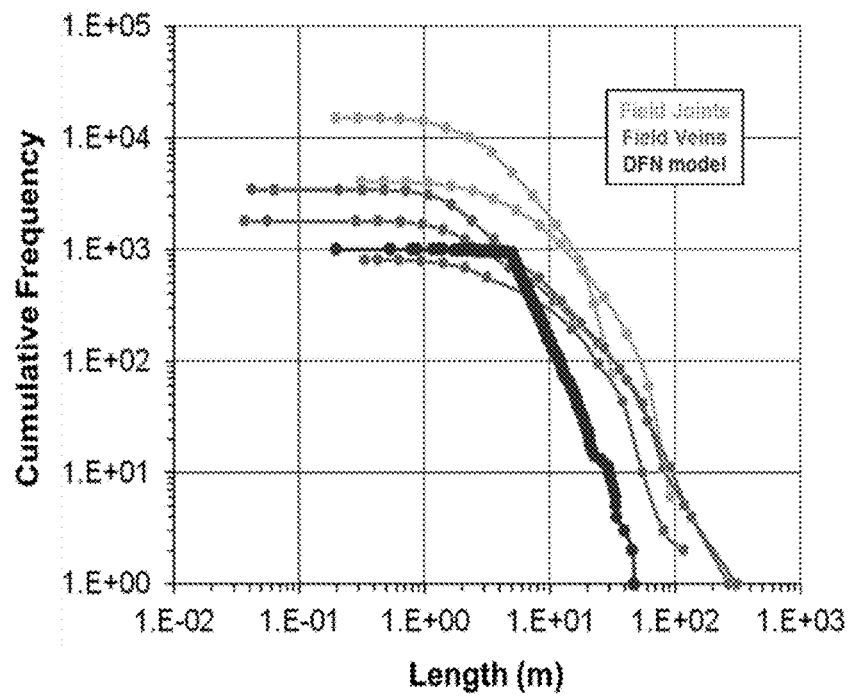
FIGS. 11A and 11B illustrate a DFN modeled geometric scaling relationships contrasted with field-measurements from fracture populations, with FIG. 11A illustrating the power-law distribution of fracture lengths and FIG. 11B correlating aperture versus length scaling of opening-mode fracture sets.
Figure 11B:
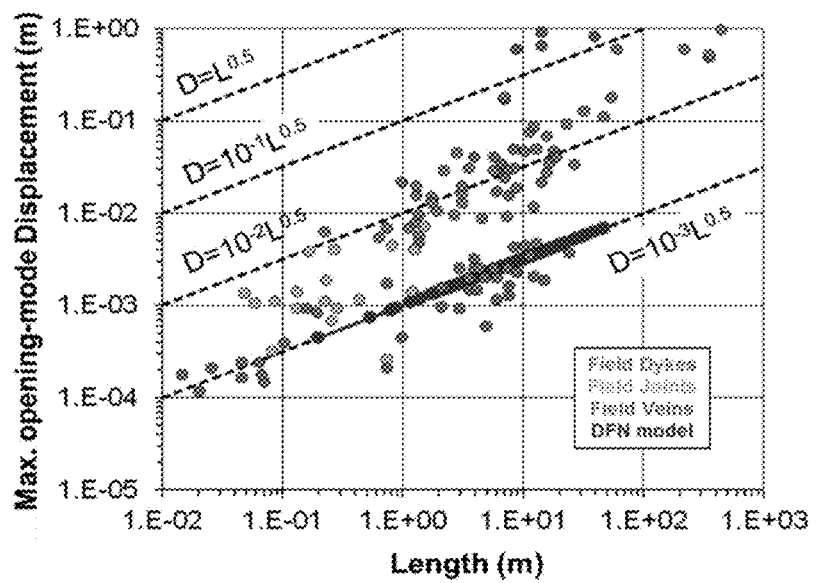

Thus, commercially available DFN software can be used to construct a fracture network. For example, as seen in FIG. 10, a simplified DFN model cell can be setup that represent areal dimensions of 100×100 m with 2 m unit thickness in the z-direction and which contains pervasive fracture sets each containing 1,000 fractures. The model seeks to replicate some of the statistical relationships observed in opening mode fracture populations in the field. Power-law scaling can then be used to describe the cumulative frequency distribution of the fracture lengths. This frequency-size relationship can be maintained constant for both fracture sets with a slope of −2.5 (1 m<length<100 m, truncated at 5 m) and as shown in FIG. 11A is broadly reprehensive of fracture scaling relationships observed in the field, e.g., joint and vein arrays (for example, as described in Gillespie et al, "Scaling relationships of Joint and Vein arrays from the Burren, Col., Clare, Ireland", *Structureal Geology*, Vol 23, pp. 183-201 (2001)). Additionally, a correlated fracture-length-to-aperture relationship for both fracture sets in the DFN model can be implemented as shown in FIG. 11B, which for example, may be based on a compilation of opening mode fracture sets that include veins, joints, and dykes (see Klimczak et al., "Cubic law with aperture-length correlation: implications for network scale fluid flow", *Hydrology Journal* (2010)). For example, fracture aperture scales with a fracture length as a power-law function with an exponent of n=0.5 may be used.

As these distributions of geometric attributes are derived from direct observation of exposed natural fracture populations at the earth's surface and, therefore, at an initial unstressed state the functional relationship shown schematically in FIG. 9A can be used in the case of no resolved shear stress on the fracture surface in order to calculate a unique fracture stiffness characteristic "$\chi_M$" for each initial unstressed fracture aperture "$b_{M0}$" represented in the DFN. Knowing the initial mechanical aperture and stiffness characteristic for each fracture in the DFN (unstressed state) enables the normal closure of each fracture to be calculated via Equation 3 in order to generate the equivalent DFN model representative of the fracture population at "initial reservoir stress conditions" (IRSC) prior to production where "$b_M(\sigma')$" represents the mechanical aperture of each fracture at IRSC and "$\sigma'$" represents the resolved effective normal stress acting across each discrete fracture within the fracture system at IRSC and is readily calculated at block 270 of FIG. 2 using established practices. In a similar manner the mechanical aperture at IRSC for fractures experiencing non-zero resolved shear stresses may be calculated using an alternative to Equation 3 described above that allows for the calculation of the impact of resolved shear stress on mechanical aperture. See Jaeger et al, "Fundamentals of Rock Mechanics", Blackwell Publishing, pp. 27-38 (2007). Accordingly the relative orientation of each fracture plane (as defined in terms of a fracture normal orientation "n" within a geographic coordinate system) with respect to the IRSC in situ stress field (assuming a far-field orthogonal total principal stresses coordinate system) enables "$\sigma'$" to be calculated from Equation 9:

$$\sigma' = [S_V(\cos\beta_1)^2 + S_H(\cos\beta_1)^2 + S_h(\cos\beta_2)^2] - P_{res} \quad \text{Equation 9}$$

where the total principal stress magnitudes are: $S_v$=overburden stress (as routinely calculated by integrating a density log); $S_H$=maximum horizontal stress (as routinely calculated from analysis of borehole breakouts); $S_h$=minimum horizontal stress (as routinely measured from leak-off tests). "$P_{res}$" represents the reservoir fluid pressure (as routinely measured using a variety of well-established techniques) and $\beta_1$, $\beta_2$, and $\beta_3$ represent the three angles taken to "n" from the maximum horizontal, the minimum horizontal and the vertical overburden total principal compressive stresses respectively (see FIG. 12B). Thus FIG. 12B, illustrates a schematic representation of two right-hand rectangular Cartesian coordinate systems that illustrate (i) orientation of fracture plane and fracture normal vector with respect to geographic East-North-Up coordinate system (shown in grey in FIG. 12B), and (ii) fracture normal orientation angles $\beta_1$, $\beta_2$, and $\beta_3$ with respect to the principal stress coordinate system and the resolved fracture normal "clamping" stress (shown in black in FIG. 12B). In a similar manner and using established methods, the shear stress resolved on a given fracture may also be calculated.

Knowing the fracture normal stress "$\sigma'$" in the case of zero resolved shear stress and the fracture stiffness characteristic "$\chi_M$" for each initial fracture aperture "$b_{M0}$" in the DFN model enables fracture stiffness "$\kappa$" to be calculated, for example using Equation 7, which in turn enables fracture closure "$\Delta b_M$" to be calculated from the semi-logarithmic relation, for example by Equation 6, such that the mechanical aperture of each fracture within the fracture system at IRSC "$b_M(\sigma')$" is readily obtainable, for example from Equation 3. In addition, Equation 9 can be used to calculate how the in situ effective normal stress would change with production (reservoir pressure reduction, $\Delta P_{res}$) by assuming that changes in effective horizontal and vertical stresses from pre-production IRSC are related via Equation 10:

$$\Delta\sigma_h = K_0 \cdot \Delta\sigma_{ovb} \quad \text{Equation 10}$$

where the proportionality constant "$K_o$" is termed the "coefficient-of-earth-pressure-at-rest" (see Brooker & Ireland, "Earth pressures at rest related to stress history", *Canadian Geotech. J.*, 2(1), pp. 1-15, 1965) and normally ranges from about 0.50 to about 0.60 for sands and from about 0.60 to about 0.65 for shales/porous carbonates depending on material properties and stress history (see Crawford et al, "Modeling and Prediction of Formation Compressibility and Compactive Pore Collapse in Siliciclastic Reservoir Rocks", *American Rock Mechanics Association*, Paper #11-384, presented at the 45th US Rock Mechanics/Geomechanics Symposium, Jun. 26-29, 2011). In the case of non-zero resolved shear stresses a similar methodology to that outlined above may be employed however using variants of Equations 2, 3 and 7 that include the additional effects of shear stress and the additional calculation of resolved shear stress on each fracture.

Thus it can be assumed that the likely variation in the $K_0$-value and the $S_h$:$S_H$-ratio with production (for example that they both remain constant) enables the increase in normal stress magnitude "$\sigma'$" in response to a reduction in pore pressure and therefore the resultant fracture closure "$\Delta b_M$" to be calculated as a function of simulated drawdown/depletion of reservoir pressure using the calculation procedure as detailed above. In the case of injection where pore pressure may increase to values larger than that associated with the maximum drawdown/depletion, fracture stiffness "$\kappa$" may be held constant for each fracture in the DFN at whatever value it had attained at its highest drawdown/depletion state. The calculation procedure detailed above may then be used to calculate the fracture closure or opening "$\Delta b_M$" as a function of the simulated changes of reservoir pressure. The DFN may then be used to determine fracture network porosity "$\varphi_f$" of the DFN system from Equation 11:

$$\varphi_f(P_{res}) = \frac{PV}{BV} = \frac{\sum (A_f \cdot b_M) - \sum (A_f \cdot \Delta b_M)}{BV} \quad \text{Equation 11}$$

where total fracture network porosity as a function of reservoir pressure "$f(P_{res})$" equals the ratio of fracture pore volume "PV" to DFN model bulk volume "BV" (BV=model length×width×height). The fracture "PV" at IRSC can be derived by summing the pore volume of each individual fracture in the network at IRSC which is simply equal to the product of fracture area "$A_f$" and fracture mechanical aperture "$b_M$". Reduction in network porosity due to stress-sensitive (depletion-induced) closure or opening of mechanical aperture "$\Delta b_M$" may be calculated as indicated in Equation 11.

Figure 13A:
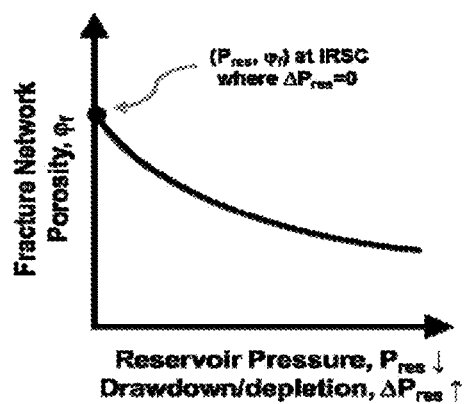
FIGS. 13A and 13B are schematic representations of DFN-derived functional relationships between reservoir fluid pressure and fracture system porosity (in FIG. 13A) and directional fracture system permeability (in FIG. 13B).

An advantage of the methods described herein, is that the fracture network compressibility "$C_f$", which is of importance in material balance calculations for predicting recovery, is readily calculated from the $\varphi_f = f(P_{res})$ relationship (shown schematically in FIG. 13A) using Equation 12:

$$C_f = \frac{1}{\text{fracture pore volume}} \frac{\Delta(\text{fracture volume})}{\Delta(\text{reservoir pressure})} = \frac{1}{\varphi_f \text{ at } IRSC} \frac{\Delta \varphi_f}{\Delta P_{res}} \quad \text{Equation 12}$$

In the absence of a hydraulically calibrated DFN, a roughness-related mechanical to hydraulic aperture conversion (such as that in FIG. 9B and Equation 8) can be utilized to convert the DFN distribution of mechanical apertures at a given simulated reservoir fluid pressure (associated with drawdown/depletion from IRSC or reinjection) to an equivalent distribution of hydraulic apertures. Once hydraulic apertures are obtained they can then be used to calculate reservoir fluid pressure dependent directional fracture system permeabilities in the DFN x-, y-, and z-directions using for example the tensor approach. See Oda "Permeability tensor for discontinuous rock masses", Géotechnique, 35 (4), pp. 483-495 (1985).

Figure 13B:
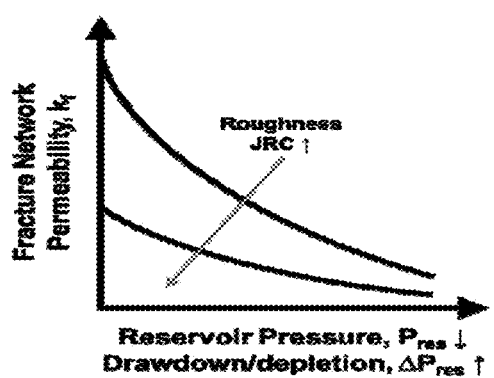

In block 280 of FIG. 2, reservoir-pressure dependent fracture system porosity and directional fracture system permeabilities as shown schematically in FIG. 13 (note that matrix block sizes remain independent of changes in reservoir stress) are exported from the DFN into the reservoir simulator, such as the dual porosity simulator in the conventional workflow shown schematically in FIG. 1.

As the reservoir simulation model is frequently history matched with data e.g. well testing and/or image logs) that is quantified at pre-production reservoir stress conditions (as opposed to an initial unstressed state) it is advantageous to be able to calculate fracture network closure commencing from IRSC as opposed to surface outcrop (zero stress) conditions. In this instance the initial aperture is not the unstressed mechanical aperture "$b_{M0}$" but rather is quantified at IRSC "$b_{IRSC}$" such that in the case of zero resolved shear stress on a given fracture both are related through Equation 13:

$$b_{IRSC} = b_{M0} - \Delta b_M = \quad \text{Equation 13}$$
$$b_{M0} - \frac{1}{\chi} \ln\left(\frac{\sigma'_{IRSC}}{\sigma'_{ref}}\right) = b_{M0} - [1/f(b_{M0})] \cdot \ln(\sigma'_{IRSC})$$

Assuming $\chi = f(b_{M0})$ and $\sigma'_{ref} = 1$, Equation 13 can be used to solve for "$b_{M0}$" so that the previously described scaling the of fracture stiffness characteristic with initial (unstressed) fracture aperture functional relationship can be used to generate the appropriate $\chi$-magnitudes for calculating fracture network response to declining reservoir pressure for the purposes of improved reservoir performance prediction. As described above, in the case of non-zero resolved shear stresses a similar methodology to that outlined above may be employed to calculate the pre-production reservoir state however using a variant of Equations 13 that includes the additional effects of shear stress.

Figure 14A:
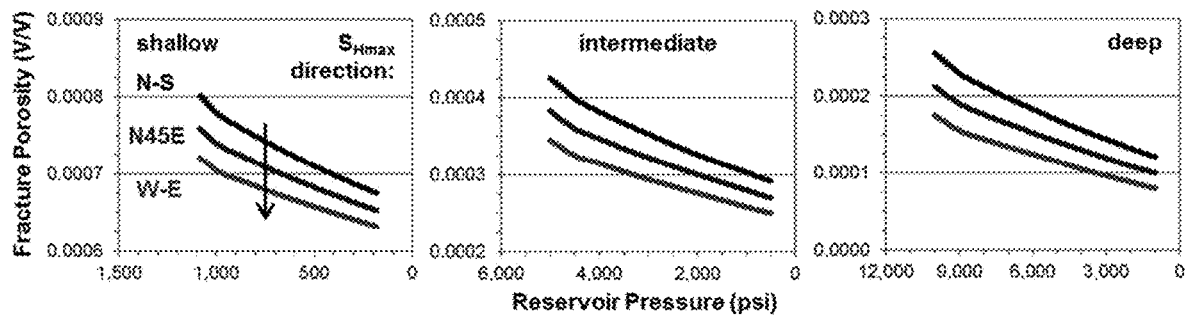
FIGS. 14A, 14B, and 14C illustrate stress-sensitive DFN properties as a function of drawdown/depletion of reservoir fluid pressure, with an orientation of maximum horizontal compressive stress and fracture surface roughness, with FIG. 14A showing fracture network porosity, $\varphi f(V/V)$, FIG. 14B showing the fracture network compressibility, and FIG. 14C showing the fracture network permeability.
Figure 14B:
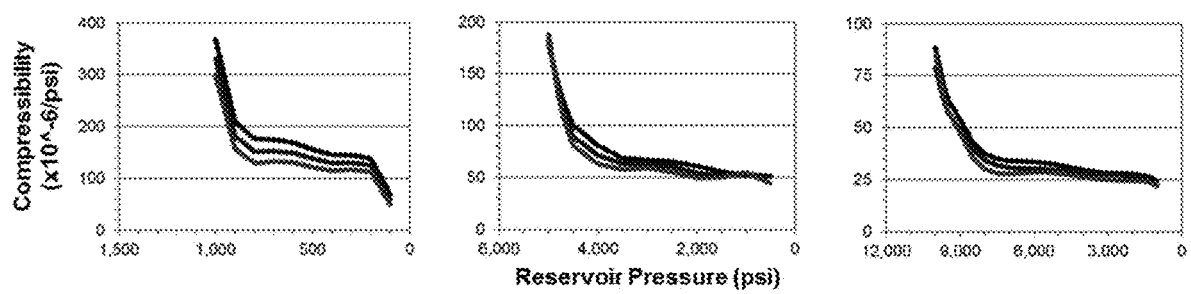
Figure 14C:
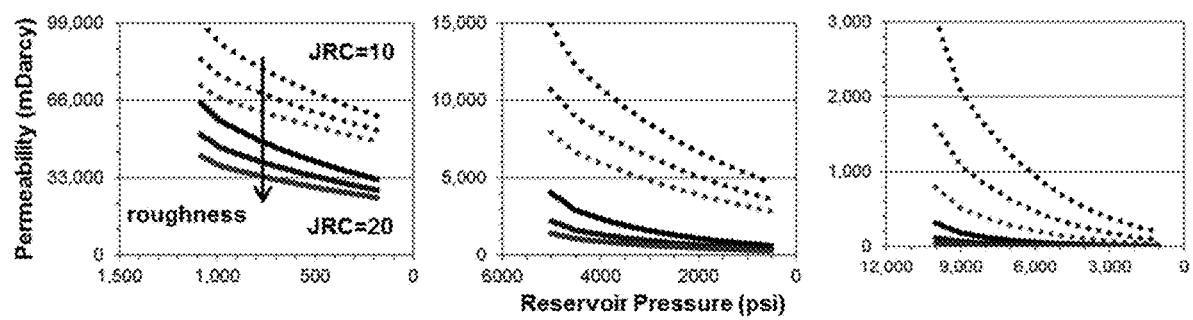

An example of DFN generated results illustrating the sensitivity of fracture network properties (e.g., porosity, compressibility, and permeability) to varying effective normal stresses associated with burial depth, pressure drawdown/depletion, and orientation relative to the anisotropic horizontal stress field is illustrated in FIG. 14. FIG. 14A illustrates the fracture network porosity, which can be determined as the ratio of fracture pore volume to model bulk volume in which only the fracture pore volume is stress sensitive and obtained by summing the pore volume of each individual fracture in the network as given by the product of fracture area and stress-sensitive mechanical aperture. As seen in FIG. 14A, in this example, the fracture porosity shows an order of magnitude reduction with increasing reservoir depth and pressure depletion and as the maximum compressive horizontal stress is rotated from a North-South to a West-East direction. The fracture network compressibility is shown in FIG. 14B, and can be calculated from the change in fracture porosity associated with the reservoir pressure decline from the initial pre-production conditions. As seen in FIG. 14B, the fracture compressibility is observed to reduce as reservoir pressure is reduced 90% from initial conditions, with the amount of the reduction depending primarily on burial depth. As seen in FIG. 14C, the network permeability shows a strong dependence on resolved stress and varies depending on depth, depletion, stress orientation, and additional fracture surface roughness effects as represented by increasing the JRC index. The DFN-generated functional relationships between reservoir pressure and fracture system porosity, compressibility, and directional network permeabilities (as illustrated in FIG. 14) can then be exported to a reservoir simulator to forecast reservoir performance.

Thus, in some embodiments the methods described herein can be used to predict a fractured reservoirs permeability and porosity as a function of pressure. This can then be used to simulate a reservoirs performance over different time-step iterations at different pressures. For example, a first iteration can simulate a reservoirs performance at a first depletion level, and then a second iteration can simulate the reservoirs performance at a second depletion level, where the second depletion level is greater than or less than the first depletion level. For example, the first iteration can be run at a depletion level of 75% and the second iteration can be run at a depletion level of 50%. By running multiple iterations, one can understand and determine what the depletion limits are for the reservoir, i.e., at what point is the pressure reduction so great that the permeability pathways in the fractured reservoir are closed. Thus, the methods described herein may be used in pressure-management of the reservoir, as they can help better predict when the pressure of the reservoir needs adjustment, e.g., through re-injection, to obtain economic flow rates. Further, the methods described herein could be used to predict when one may want to hasten the depletion of a reservoir, for example, to avoid water breakthrough.

Figure 15:
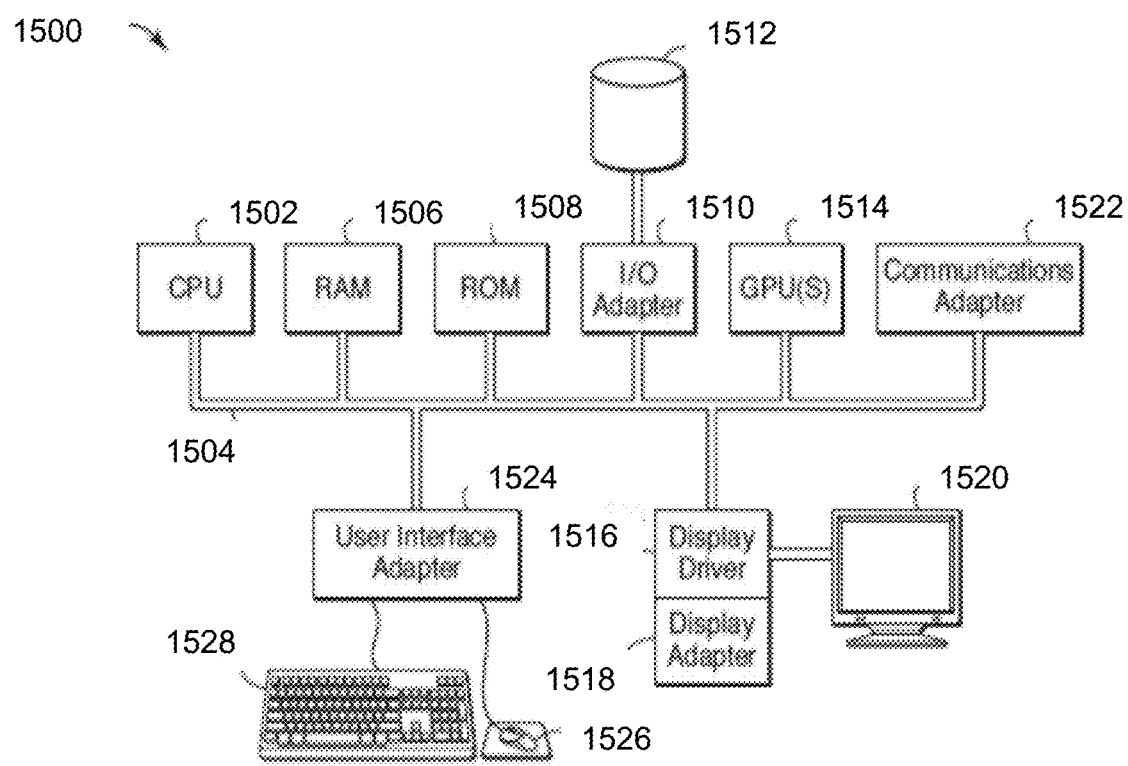
FIG. 15 is a block diagram of a computer system that may be used to perform one or more steps of the methods described herein.

FIG. 15 is a block diagram of an exemplary computer system 1500 that may be used to perform one or more portions of the methods disclosed herein. A central processing unit (CPU) 1502 is coupled to system bus 1504. The CPU 1502 may be any general-purpose CPU, although other types of architectures of CPU 1502 (or other components of exemplary system 1500) may be used as long as CPU 1502 (and other components of system 1500) supports the inventive operations as described herein. The CPU 1502 may execute the various logical instructions according to disclosed aspects and methodologies. For example, the CPU 1502 may execute machine-level instructions for performing processing according to aspects and methodologies disclosed herein.

The computer system 1500 may also include computer components such as a random access memory (RAM) 1506, which may be SRAM, DRAM, SDRAM, or the like. The computer system 1500 may also include read-only memory (ROM) 1508, which may be PROM, EPROM, EEPROM, or the like. RAM 1506 and ROM 1508 hold user and system data and programs, as is known in the art. The computer system 1500 may also include an input/output (I/O) adapter 1510, a communications adapter 1522, a user interface adapter 1524, and a display adapter 1518. The I/O adapter 1510, the GPUs 1514, the user interface adapter 1524, and/or communications adapter 1522 may, in certain aspects and techniques, enable a user to interact with computer system 1500 to input information.

The I/O adapter 1510 preferably connects a storage device(s) 1512, such as one or more of hard drive, compact disc (CD) drive, floppy disk drive, tape drive, etc. to computer system 1500. The storage device(s) may be used when RAM 1506 is insufficient for the memory requirements associated with storing data for operations of embodiments of the present techniques. The data storage of the computer system 1500 may be used for storing information and/or other data used or generated as disclosed herein. The communications adapter 1522 may couple the computer system 1500 to a network (not shown), which may enable information to be input to and/or output from system 1500 via the network (for example, a wide-area network, a local-area network, a wireless network, any combination of the foregoing). User interface adapter 1524 couples user input devices, such as a keyboard 1528, a pointing device 1526, and the like, to computer system 1500. The display adapter 1518 is driven by the CPU 1502 to control, through a display driver 1516, the display on a display device 1520. Information and/or representations of one or more 2D canvases and one or more 3D windows may be displayed, according to disclosed aspects and methodologies.

The architecture of system 1500 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

In one or more embodiments, the method may be implemented in machine-readable logic, set of instructions or code that, when executed, performs a methods described herein to simulate a fractured reservoir. The code may be used or executed with a computing system such as computing system 1500. The computer system may be utilized to store the set of instructions that are utilized to manage the data, the different measurement techniques, and other aspects of the present techniques.

As an example, a computer system for simulating a fractured reservoir may include a processor; memory coupled to the processor; and a set of instructions, stored in the memory and when executed, are configured to: create a fracture network model that incorporates a stiffness and roughness relationship, a distribution of fracture lengths and apertures, and resolved effective normal and/or shear stress; incorporate the fracture network model into a reservoir simulator; run the simulator in a forecast mode to predict the performance of the reservoir. In some embodiments, the set of instructions may be configured to validate the reservoir simulator. The validation may include comparing one or more forecasts from the reservoir simulator with well production data.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

The invention claimed is:

1. A method for modeling and simulating a fractured reservoir comprising:

compiling a database of sample pairs, wherein one sample of each pair is a fractured sample and wherein the other sample of each pair is an unfractured sample;

determining an initial open aperture ($b_{M0}$) of the fractured samples;

determining a mechanical closure ($\Delta b_M$) of the fractured samples, wherein the mechanical closure of the fractured samples is determined by calculating the difference between the compression curves of the fractured sample and the unfractured sample of a sample pair when the samples are subjected to an effective hydrostatic pressure that is equivalent to the effective fracture normal stress; and using the initial open fracture ($b_{M0}$) and the mechanical closure ($\Delta b_M$) to determine a mechanical stiffness characteristic ($\chi_M$) of the fractured sample;

incorporating the mechanical stiffness characteristic ($\chi_M$) into a fracture network model;

incorporating the fracture network model into a reservoir simulator; and using the reservoir simulator to predict at least one of the fractured reservoir's permeability and porosity; and carrying out hydrocarbon production operations on the fractured reservoir, using the reservoir simulator's prediction to manage pressure of the fractured reservoir during the hydrocarbon production operations.

2. The method of claim 1, wherein the initial open aperture of the fractured samples is determined using x-ray computed tomography.

3. The method of claim 1, wherein using the reservoir simulator to predict at least one of the fractured reservoir's permeability and porosity comprises running the reservoir simulator at a first time to predict the reservoir permeability at a first pressure and running the reservoir simulator at a second time to predict the reservoir permeability at a second pressure.

4. The method of claim 3, wherein the difference in permeability at the first time and second time is used to manage the pressure of the fractured reservoir.

5. The method of claim 4, wherein managing the pressure of the fractured reservoir comprises a re-injection to increase the pressure of the fractured reservoir.

6. A method for modeling and simulating a fractured network in a hydrocarbon reservoir comprising:
obtaining one or more pairs of rock samples, wherein each pair of samples comprises a fractured sample of rock and an unfractured sample of rock;
characterizing the sample pairs, wherein the characterization comprises determining an initial open aperture of the fractured sample;
determining the initial open aperture ($b_{M0}$) of the fractured sample in each sample pair;
using the initial open aperture ($b_{M0}$) to determine a mechanical stiffness characteristic ($\chi_M$);
using the mechanical stiffness characteristic ($\chi_M$) to determine fracture stiffness ($\kappa$);
using the fracture stiffness ($\kappa$) to determine a mechanical aperture ($b_M(\sigma')$);
using the mechanical aperture ($b_M(\sigma')$) to determine a hydraulic aperture ($b_H(\sigma')$);
developing a discrete fracture network model for a hydrocarbon reservoir at an initial reservoir stress conditions;
updating the discrete fracture network to a second stress condition, where the second stress condition reflects a change in pressure in the hydrocarbon reservoir due to depletion of hydrocarbons in the hydrocarbon reservoir;
using the discrete fracture network model to determine a total fracture network porosity ($\varphi_f$) by the following equation:

$$\varphi_f(P_{res}) = \frac{\sum (A_f \cdot b_M) - \sum (A_f \cdot \Delta b_M)}{BV} \qquad \text{Equation 11}$$

where "$\varphi_f(P_{res})$" is the total fracture network porosity as a function of reservoir pressure, which is defined mathematically as the ratio of fracture pore volume (PV) to the discrete fracture network model bulk volume (BV), and where $A_f$ is the fracture area and where $b_M$ is the fracture mechanical aperture; and
incorporating the discrete fracture network model into a reservoir simulator.

7. The method of claim 6, wherein characterizing the sample pairs further comprises determining one or more mechanical properties of the sample pair.

8. The method of claim 7, wherein the mechanical properties comprise one or more of bulk modulus, Young's modulus, and unconfined compressive strength.

9. The method of claim 6, wherein the initial open aperture is determined using x-ray computed tomography.

10. The method of claim 6 wherein characterizing the sample pairs further comprises conducting a profilometry of the fracture face of each fractured sample to determine a roughness of the fractured sample.

11. The method of claim 6, wherein the fracture stiffness ($\kappa$) is determined using the following equation:

$$\kappa = \left(\frac{d\kappa}{d\sigma'}\right)\sigma' = \chi \cdot \sigma'$$

where $\sigma$ is a normal stress.

12. The method of claim 6, wherein the mechanical aperture is determined using the following equation:

$$b_M(\sigma') = b_{M0} - \Delta b_M = b_{M0} - \frac{\sigma'}{\kappa}.$$

13. The method of claim 6 wherein the discrete fracture model further comprises a distribution of fracture lengths and apertures.

14. The method of claim 6, wherein the discrete fracture model further comprises a resolved effective stress.

15. The method of claim 6, further comprising determining a fracture network compressibility ($C_f$) according to the following equation:

$$C_f = \frac{1}{\varphi_f \text{ at } IRSC} \frac{\Delta \varphi_f}{\Delta P_{res}}$$

where $\varphi_f$ at IRSC is the network porosity at initial reservoir stress conditions,
where $\Delta P_{res}$ is the change in reservoir pressure, and where $\Delta \varphi_f$ is the change in fracture volume.

16. The method of claim 6, wherein the reservoir simulator comprises a dual porosity reservoir simulator.

17. The method of claim 6, further comprising validating the reservoir simulator using well production data.

18. The method of claim 6, further comprising running the reservoir simulator in forecast mode to predict the performance of the hydrocarbon reservoir.

19. The method of claim 6, wherein the reservoir simulator is utilized in the developing or refining of a development or production strategy of the hydrocarbon reservoir.

20. The method of claim 6, further comprising producing hydrocarbons from the hydrocarbon reservoir.

* * * * *